US012486342B2

(12) United States Patent
Gao et al.

(10) Patent No.: US 12,486,342 B2
(45) Date of Patent: *Dec. 2, 2025

(54) CYCLOPENTADIENYL/ADAMANTYL PHOSPHINIMINE ZIRCONIUM AND HAFNIUM COMPLEXES

(71) Applicant: NOVA CHEMICALS (INTERNATIONAL) S.A., Fribourg (CH)

(72) Inventors: Xiaoliang Gao, Calgary (CA); Charles Carter, Calgary (CA); P. Scott Chisholm, Calgary (CA); Janelle Smiley-Wiens, Calgary (CA); Darryl Morrison, Calgary (CA); Alva Woo, Calgary (CA); Cheng Fan, Calgary (CA); Chia Yun Chang, Calgary (CA); Frederick Chiu, Calgary (CA)

(73) Assignee: NOVA CHEMICALS (INTERNATIONAL) S.A., Fribourg (CH)

( * ) Notice: Subject to any disclaimer, the term of this patent is extended or adjusted under 35 U.S.C. 154(b) by 587 days.

This patent is subject to a terminal disclaimer.

(21) Appl. No.: 17/919,036

(22) PCT Filed: Apr. 16, 2021

(86) PCT No.: PCT/IB2021/053165
§ 371 (c)(1),
(2) Date: Oct. 14, 2022

(87) PCT Pub. No.: WO2021/214612
PCT Pub. Date: Oct. 28, 2021

(65) Prior Publication Data
US 2023/0235100 A1 Jul. 27, 2023

Related U.S. Application Data

(60) Provisional application No. 63/012,968, filed on Apr. 21, 2020.

(51) Int. Cl.
*C08F 4/6592* (2006.01)
*C07F 17/00* (2006.01)
*C08F 210/16* (2006.01)

(52) U.S. Cl.
CPC ............ *C08F 4/6592* (2013.01); *C07F 17/00* (2013.01); *C08F 210/16* (2013.01)

(58) Field of Classification Search
None
See application file for complete search history.

(56) References Cited

U.S. PATENT DOCUMENTS

| | | |
|---|---|---|
| 3,248,179 A | 4/1966 | Norwood |
| 3,324,095 A | 6/1967 | Carrick et al. |
| 4,588,790 A | 5/1986 | Jenkins, III et al. |
| 4,613,484 A | 9/1986 | Ayres et al. |
| 5,462,999 A | 10/1995 | Griffin et al. |
| 5,589,555 A | 12/1996 | Zboril et al. |
| 5,684,097 A | 11/1997 | Palmroos et al. |
| 6,024,483 A | 2/2000 | Burke et al. |
| 6,063,879 A | 5/2000 | Stephan et al. |
| 2018/0194874 A1 | 7/2018 | Kim et al. |

FOREIGN PATENT DOCUMENTS

| | | |
|---|---|---|
| DE | 10 2007 057 854 A1 | 6/2009 |
| WO | WO-2016/057270 A2 | 4/2016 |

OTHER PUBLICATIONS

Alhomaidan et al., "Hafnium-Phosphinimide Complexes," Can. J. Chem., vol. 87 (2009), pp. 1163-1172.
ASTM 4703-16, Standard Practice for Compression Molding Thermoplastic Materials into Test Specimens, Plaques, or Sheets, Oct. 16, 2019, 13 pages.
ASTM 6645-01, Standard Test Method for Methyl (Comonomer) Content in Polyethylene by Infrared Spectrophotometry, Reapproved 2010, 4 pages.
International Search Report and Written Opinion of the International Searching Authority issued in PCT Application No. PCT/IB2021/053165, mailed Jun. 17, 2021.
Pangborn et al., "Safe and Convenient Procedure for Solvent Purification," Organometallics 1996, 15, pp. 1518-1520.
Williams et al., "Drying of Organic Solvents: Quantitative Evaluation of the Efficiency of Several Desiccants," J. Org. Chem. 2010, 75, 8351-8354.
Zhao et al., "Lewis Acid Mediated Reactions of Zirconacycolpentadienes with Aldehydes: One-Pot Synthetic Route to Indene and Cyclopentadiene Derivatives from Aldehydes and Benzyne or Alkynes," Chem. Eur. J. 2002, 8(18), pp. 4292-4298.

*Primary Examiner* — Catherine S Branch
(74) *Attorney, Agent, or Firm* — Thomas J. Styslinger

(57) ABSTRACT

Provided in this disclosure are zirconium and hafnium complexes that contain 1) a cyclopentadienyl ligand; 2) an adamantyl-phosphinimine ligand; and 3) at least one other ligand. The use of such a complex, in combination with an activator, as an olefin polymerization catalyst is demonstrated. The catalysts are effective for the copolymerization of ethylene with an alpha olefin (such as 1-butene, 1-hexene, or 1-octene).

23 Claims, No Drawings

CYCLOPENTADIENYL/ADAMANTYL PHOSPHINIMINE ZIRCONIUM AND HAFNIUM COMPLEXES

CROSS-REFERENCE TO RELATED PATENT APPLICATIONS

This application is a National Phase entry of PCT/IB2021/053165, filed Apr. 16, 2021, which claims the benefit of priority to U.S. Provisional Patent Application No. 63/012,968, filed Apr. 21, 2020, both of which are incorporated herein by reference in their entirety.

TECHNICAL FIELD

The present disclosure relates to new zirconium and hafnium complexes having a cyclopentadienyl ligand and an adamantyl phosphinimine ligand and olefin polymerization catalyst systems that employ these complexes.

BACKGROUND ART

Group 4 metal complexes having a cyclopentadienyl ligand and a phosphinimine ligand, and the use of such complexes as olefin polymerization catalysts, is disclosed in U.S. Pat. No. 6,063,879 (Stephan et al, to NOVA Chemicals International S.A.).

SUMMARY OF INVENTION

In one embodiment, the present disclosure provides a complex having the formula $(PI)(Cp)ML_2$, wherein:

I) PI is a phosphinimine ligand defined by the formula:

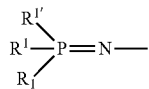

where N is a nitrogen atom; P is a phosphorus atom; each $R^1$ is unsubstituted adamantyl, or substituted adamantyl; and $R^{1'}$ is selected from the group consisting of unsubstituted adamantyl, substituted adamantyl and $C_1$ to $C_6$ hydrocarbyl;

II) Cp is a cyclopentadienyl-type ligand comprising a 5-membered carbon ring having delocalized bonding within the ring and bound to M, which ring is unsubstituted or may be further substituted;

III) each L is an activatable ligand; and

IV) M is zirconium or hafnium.

In another embodiment, the present disclosure provides an olefin polymerization catalyst system comprising:

A) a complex having the formula $(PI)(Cp)ML_2$, wherein:

I) PI is a phosphinimine ligand defined by the formula:

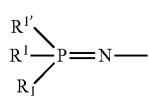

where N is a nitrogen atom; P is a phosphorus atom; each $R^1$ is unsubstituted adamantyl, or substituted adamantyl; and $R^{1'}$ is selected from the group consisting of unsubstituted adamantyl, substituted adamantyl and $C_1$ to $C_6$ hydrocarbyl;

II) Cp is a cyclopentadienyl-type ligand comprising a 5-membered carbon ring having delocalized bonding within the ring and bound to M, which ring is unsubstituted or may be further substituted;

III) each L is an activatable ligand; and

IV) M is zirconium or hafnium; and

B) an activator.

In another embodiment, the present disclosure provides a process for the polymerization of olefins comprising contacting one or more of ethylene and $C_3$ to $C_{10}$ alpha olefins with an olefin polymerization catalyst system under polymerization conditions; wherein the olefin polymerization catalyst system comprises:

A) a complex having the formula $(PI)(Cp)ML_2$, wherein:

I) PI is a phosphinimine ligand defined by the formula:

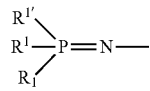

where N is a nitrogen atom; P is a phosphorus atom; each $R^1$ is unsubstituted adamantyl, or substituted adamantyl; and $R^{1'}$ is selected from the group consisting of unsubstituted adamantyl, substituted adamantyl and $C_1$ to $C_6$ hydrocarbyl;

II) Cp is a cyclopentadienyl-type ligand comprising a 5-membered carbon ring having delocalized bonding within the ring and bound to M, which ring is unsubstituted or may be further substituted;

III) each L is an activatable ligand; and

IV) M is zirconium or hafnium; and

B) an activator.

In an embodiment, the present disclosure provides a complex having the formula:

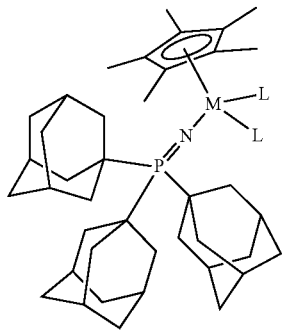

wherein each L is an activatable ligand; and wherein M is zirconium or hafnium.

In an embodiment, the present disclosure provides a complex having the formula:

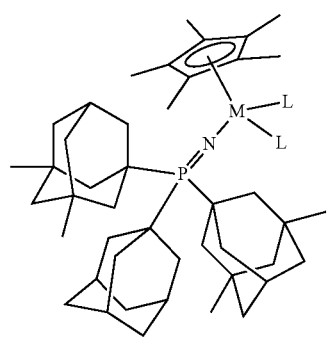

wherein each L is an activatable ligand; and wherein M is zirconium or hafnium.

In another embodiment, the present disclosure provides an olefin polymerization catalyst system comprising:

A) a complex having the formula:

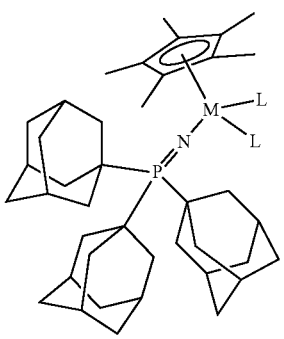

wherein each L is an activatable ligand; and wherein M is zirconium or hafnium; and B) an activator.

In another embodiment, the present disclosure provides an olefin polymerization catalyst system comprising:

A) a complex having the formula:

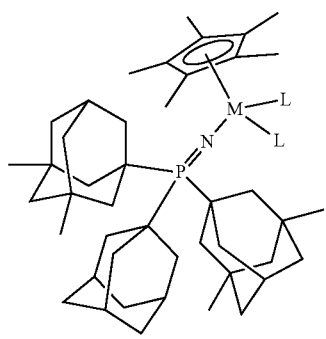

wherein each L is an activatable ligand; and wherein M is zirconium or hafnium; and B) an activator.

In another embodiment, the present disclosure provides a process for the polymerization of olefins comprising contacting one or more of ethylene and $C_3$ to $C_{10}$ alpha olefins with an olefin polymerization catalyst system under polymerization conditions; wherein the olefin polymerization catalyst system comprises:

A) a complex having the formula:

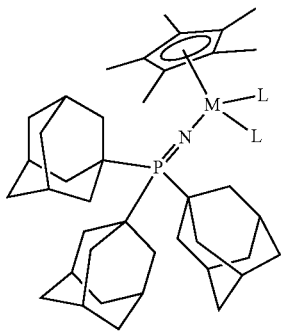

wherein each L is an activatable ligand; and wherein M is zirconium or hafnium; and B) an activator.

In another embodiment, the present disclosure provides a process for the polymerization of olefins comprising contacting one or more of ethylene and $C_3$ to $C_{10}$ alpha olefins with an olefin polymerization catalyst system under polymerization conditions; wherein the olefin polymerization catalyst system comprises:

A) a complex having the formula:

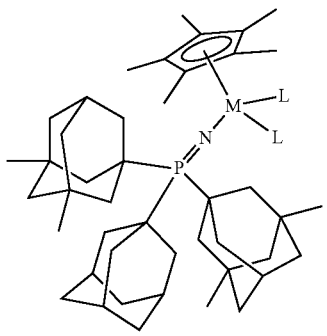

wherein each L is an activatable ligand; and wherein M is zirconium or hafnium; and B) an activator.

In an embodiment of the disclosure, an activator consists of a combination of an aluminoxane and an ionic activator (e.g., trityl borate, $[Ph_3C][B(C_6F_5)_4]$).

In an embodiment of the disclosure, an activator consists of a combination of an organoaluminum compound and an ionic activator (e.g., trityl borate, $[Ph_3C][B(C_6F_5)_4]$).

DESCRIPTION OF EMBODIMENTS

As used herein the term "unsubstituted" means that hydrogen radicals are bonded to the molecular group that is referred to by the term unsubstituted. The term "substituted" means that the group referred to by this term possesses one or more moieties that have replaced one or more hydrogen radicals in any position within the group; non-limiting examples of moieties include halogen radicals (F, Cl, Br), an alkyl group, an alkylaryl group, an arylalkyl group, an alkoxy group, an aryl group, an aryloxy group, an amido group, a silyl group or a germanyl group, hydroxyl groups, carbonyl groups, carboxyl groups, amine groups, phosphine groups, phenyl groups, naphthyl groups, $C_1$ to $C_{10}$ alkyl groups, $C_2$ to $C_{10}$ alkenyl groups, and combinations thereof.

As used herein, the terms "hydrocarbyl", "hydrocarbyl radical" or "hydrocarbyl group" refers to linear or branched, aliphatic, olefinic, acetylenic and aryl (aromatic) radicals comprising hydrogen and carbon that are deficient by one hydrogen. The term "cyclic hydrocarbyl group" connotes hydrocarbyl groups that comprise cyclic moieties and which may have one or more than one cyclic aromatic ring, and/or one or more than one non-aromatic ring. The term "acyclic hydrocarbyl group" connotes hydrocarbyl groups that do not have cyclic moieties such as aromatic or non-aromatic ring structures present within them.

As used herein, the term "heteroatom" includes any atom other than carbon and hydrogen that can be bound to carbon. The term "heteroatom containing" or "heteroatom containing hydrocarbyl group" means that one or more than one non carbon atom(s) may be present in the hydrocarbyl groups. Some non-limiting examples of non-carbon atoms that may be present is a heteroatom containing hydrocarbyl group are N, O, S, P and Si as well as halides such as for example Br and metals such as Sn. Some non-limiting examples of heteroatom containing hydrocarbyl groups include for example imines, amine moieties, oxide moieties, phosphine moieties, ethers, ketones, heterocyclics, oxazolines, thioethers, and the like.

As used herein, an "alkyl radical" or "alkyl group" includes linear, branched and cyclic paraffin radicals that are deficient by one hydrogen radical; non-limiting examples include methyl (—$CH_3$) and ethyl (—$CH_2CH_3$) radicals. The term "alkenyl radical" or "alkenyl group" refers to linear, branched and cyclic hydrocarbons containing at least one carbon-carbon double bond that is deficient by one hydrogen radical. The term "alkynyl radical" or "alkynyl group" refers to linear, branched and cyclic hydrocarbons containing at least one carbon-carbon triple bond that is deficient by one hydrogen radical.

As used herein, the term "aryl" group includes phenyl, naphthyl, pyridyl and other radicals whose molecules have an aromatic ring structure; non-limiting examples include naphthylene, phenanthrene and anthracene. An "alkylaryl" group is an alkyl group having an aryl group pendant there from; non-limiting examples include benzyl, phenethyl and tolylmethyl. An "arylalkyl" is an aryl group having one or more alkyl groups pendant there from; non-limiting examples include tolyl, xylyl, mesityl and cumyl.

An "alkoxy" group is an oxy group having an alkyl group pendant there from; and includes for example a methoxy group, an ethoxy group, an iso-propoxy group, and the like.

An "aryloxy" group is an oxy group having an aryl group pendant there from; and includes for example a phenoxy group and the like.

Adamantyl Phosphinimine Ligand

The adamantyl phosphinimine ligand is defined as:

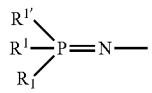

where N is a nitrogen atom; P is a phosphorus atom; each $R^1$ is unsubstituted adamantyl, or substituted adamantyl and $R^{1'}$ is selected from the group consisting of unsubstituted adamantyl, substituted adamantyl and $C_1$ to $C_6$ hydrocarbyl.

For reference, the numbering of an adamantyl carbon atom frame, in either an unsubstituted or a substituted adamantyl moiety, as referred to in the present disclosure is provided below:

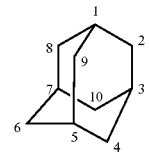

In an embodiment of the disclosure, the term "unsubstituted adamantyl" as used in this disclosure has a narrow meaning—it is restricted to the well-known hydrocarbon cage structure that contains 10 carbon atoms and excludes "substituted" adamantyl. Thus, the term unsubstituted adamantyl as used herein excludes cage structures that contain more than 10 carbon atoms and also excludes structures that contain atoms other than carbon and hydrogen atoms. It will be appreciated by those skilled in the art that there are two isomers of unsubstituted adamantyl, namely 1-adamantyl (where the adamantyl moiety is bonded from a tertiary carbon atom to the phosphorus atom of the phosphinimine ligand) and 2-adamantyl (where the adamantyl moiety is bonded from a secondary carbon atom to the phosphorus atom of the phosphinimine ligand).

In an embodiment, each of the unsubstituted adamantyl groups on the phosphinimine ligand is 1-adamantyl.

In an embodiment of the disclosure, the term "substituted adamantyl" as used in this disclosure means that the adamantyl has pendant from its 10 carbon atom frame, one or more substituent(s). It will be appreciated by those skilled in the art that there are two isomers of a substituted adamantyl, namely substituted 1-adamantyl (where the substituted adamantyl moiety is bonded from a tertiary carbon atom to the phosphorus atom of the phosphinimine ligand) and substituted 2-adamantyl (where the substituted adamantyl moiety is bonded from a secondary carbon atom to the phosphorus atom of the phosphinimine ligand).

In an embodiment, each of the substituted adamantyl groups on the phosphinimine ligand is a substituted 1-adamantyl.

In an embodiment of the disclosure, a substituted adamantyl has one or more hydrocarbyl group substituents.

In an embodiment of the disclosure, a substituted adamantyl has one or more heteroatom containing hydrocarbyl group substituents.

In an embodiment of the disclosure, a substituted adamantyl has one or more halide group substituents.

In an embodiment of the disclosure, a substituted adamantyl has one or more alkyl group substituents.

In an embodiment of the disclosure, a substituted adamantyl has one or more aryl group substituents.

In an embodiment of the disclosure, a substituted adamantyl has one or more methyl group substituents.

In an embodiment of the disclosure, a substituted 1-adamantyl has one or more hydrocarbyl group substituents.

In an embodiment of the disclosure, a substituted 1-adamantyl has one or more heteroatom containing hydrocarbyl group substituents.

In an embodiment of the disclosure, a substituted 1-adamantyl has one or more halide group substituents.

In an embodiment of the disclosure, a substituted 1-adamantyl has one or more alkyl group substituents.

In an embodiment of the disclosure, a substituted 1-adamantyl has one or more aryl group substituents.

In an embodiment of the disclosure, a substituted 1-adamantyl has one or more methyl group substituents.

In an embodiment of the disclosure, a substituted 1-adamantyl has a methyl group substituent at the 3-position and the 5-position.

In an embodiment of the disclosure, a substituted 1-adamantyl has a methyl group substituent at the 3-position, the 5-position, and the 7-position.

In an embodiment, each $R^1$ is an unsubstituted adamantyl.

In an embodiment, each $R^1$ is a substituted adamantyl.

In an embodiment, each $R^1$ is an unsubstituted 1-adamantyl.

In an embodiment, each $R^1$ is a substituted 1-adamantyl.

In an embodiment, each $R^1$ is a substituted 1-adamantyl having methyl group substituent at the 3-position and the 5-position.

In an embodiment, each $R^1$ is a substituted 1-adamantyl having a methyl group substituent at the 3-position, the 5-position, and the 7-position.

In an embodiment, $R^{1'}$ is an unsubstituted adamantyl.

In an embodiment, $R^{1'}$ is a substituted adamantyl.

In an embodiment, $R^{1'}$ is an unsubstituted 1-adamantyl.

In an embodiment, $R^{1'}$ is a substituted 1-adamantyl.

In an embodiment, $R^{1'}$ is a substituted 1-adamantyl having methyl group substituent at the 3-position and the 5-position.

In an embodiment, $R^{1'}$ is a substituted 1-adamantyl having a methyl group substituent at the 3-position, the 5-position, and the 7-position.

In an embodiment, $R^{1'}$ is a $C_1$ to $C_6$ hydrocarbyl.

Cyclopentadienyl-Type Ligand

The cyclopentadienyl-type ligands comprise a 5-membered carbon ring having delocalized bonding within the ring and bound to the metal, which ring is unsubstituted or may be further substituted (sometimes referred to in a short form as Cp ligands). Cyclopentadienyl-type ligands include unsubstituted cyclopentadienyl, substituted cyclopentadienyl, unsubstituted indenyl, substituted indenyl, unsubstituted fluorenyl and substituted fluorenyl. Hydrogenated versions of indenyl and fluorenyl ligands are also contemplated for use in the current disclosure, so long as the five-carbon ring which bonds to the metal via eta-5 (or in some cases eta-3) bonding remains intact. An exemplary list of substituents for a cyclopentadienyl-type ligand includes the group consisting of $C_{1-10}$ hydrocarbyl radicals (which hydrocarbyl radical may be unsubstituted or further substituted by for example a halide and/or a hydrocarbyl group; for example a suitable substituted $C_{1-10}$ hydrocarbyl radical is a pentafluorobenzyl group such as —$CH_2C_6F_5$); a $C_{1-4}$ alkyl radical; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R)_3$ wherein each R is independently selected from the group consisting of hydrogen, a $C_{1-8}$ alkyl or alkoxy radical, and $C_{6-10}$ aryl or aryloxy radicals; siloxy radicals and germanyl radicals of the formula Ge—$(R)_3$ wherein R is as defined directly above. The cyclopentadienyl-type ligands may also contain heterocyclic moieties or heteroatom containing hydrocarbyl groups.

In an embodiment of the disclosure, the cyclopentadienyl-type ligand is pentamethylcyclopentadienyl.

In an embodiment of the disclosure, the cyclopentadienyl-type ligand is penta (n-propyl)cyclopentadienyl.

In an embodiment of the disclosure, the cyclopentadienyl-type ligand is cyclopentadienyl.

In an embodiment, the cyclopentadienyl-type ligand is tetramethyl(pentafluorobenzyl)cyclopentadienyl, $CpMe_4$ ($CH_2C_6F_5$).

In an embodiment, the cyclopentadienyl-type ligand is (pentafluorobenzyl)cyclopentadienyl, $Cp(CH_2C_6F_5)$.

In an embodiment, the cyclopentadienyl-type ligand is tetramethyl(3,5-tert-butylphenyl)cyclopentadienyl, $CpMe_4$ (-3,5-t-$B_2$—$C_6H_3$).

In an embodiment of the disclosure, the cyclopentadienyl-type ligand is 1,2,3-trimethyl-4-phenyl-4-hydrocyclopent[b]indolyl.

Activatable Ligand

The term "activatable ligand" refers to a ligand which may be activated by a cocatalyst (also referred to as an "activator"), to facilitate olefin polymerization. An activatable ligand L may be cleaved from the metal center M of the catalyst via a protonolysis reaction or abstracted from the metal center M by suitable acidic or electrophilic catalyst activator compounds (also known as "co-catalyst" compounds) respectively, examples of which are described below. The activatable ligand L may also be transformed into another ligand which is cleaved or abstracted from the metal center M (e.g., a halide may be converted to an alkyl group). Without wishing to be bound by any single theory, protonolysis or abstraction reactions generate an active "cationic" metal center which can polymerize olefins. In embodiments of the present disclosure, the activatable ligand, L is independently selected from the group consisting of a hydrogen atom; a halogen atom; a $C_{1-10}$ hydrocarbyl radical; a $C_{1-10}$ alkoxy radical; a $C_{6-10}$ aryl oxide radical, each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryloxy radical; an amido radical which is unsubstituted or substituted by up to two $C_{1-8}$ alkyl radicals; and a phosphido radical which is unsubstituted or substituted by up to two $C_{1-8}$ alkyl radicals. Two activatable L ligands may also be joined to one another and form for example, a substituted or unsubstituted diene ligand (e.g., 1,3-diene); or a delocalized heteroatom containing group such as an acetate group.

The number of activatable ligands depends upon the valency of the metal and the valency of the activatable ligand. In some embodiments, the preferred phosphinimine catalysts are based on group 4 metals in their highest oxidation state (i.e., 4+). Particularly suitable activatable ligands are monoanionic such as a halide (e.g., chloride) or a hydrocarbyl (e.g., methyl, benzyl).

In some instances, the metal of the phosphinimine catalyst may not be in the highest oxidation state. For example, a hafnium (III) or a zirconium (III) component would contain only one activatable ligand.

In an embodiment of the disclosure, the activatable ligand, L is methyl.

In an embodiment of the disclosure, the activatable ligand, L is benzyl ("Bn" for short).

In an embodiment of the disclosure, the activatable ligand, L is chloride.

The Activator

In the present disclosure, the complex is used in combination with at least one activator (or "cocatalyst") to form an active polymerization catalyst system for olefin polymerization. Activators (i.e., cocatalysts) include ionic activator cocatalysts and aluminoxane cocatalysts and may in some embodiments include organoaluminum compounds as cocatalysts.

In an embodiment, the activator comprises one or more of the following: an aluminoxane compound, an ionic activator, an organoaluminum compound. A hindered phenol may optionally be used in combination with an aluminoxane compound or an organoaluminum compound.

In an embodiment of the disclosure the activator is an organoaluminum compound and an ionic activator. In an embodiment of the disclosure the activator is an aluminoxane compound and an ionic activator. In an embodiment of the invention the activator is an ionic activator.

In an embodiment of the disclosure the activator is selected from the group consisting of an aluminoxane, an organoaluminum compound, an ionic activator, and mixtures thereof.

Aluminoxane (Also Referred to as Alkylaluminoxane)

The activator used to activate the single site catalyst can be any suitable activator including one or more activators selected from the group consisting of alkylaluminoxanes and ionic activators, optionally together with an alkylating agent. Without wishing to be bound by theory, the alkylaluminoxanes are complex aluminum compounds of the formula: $R^4{}_2Al^1O(R^4Al^1O)_mAl^1R^4{}_2$, wherein each $R^4$ is independently selected from the group consisting of $C_{1-20}$ hydrocarbyl radicals and m is from 3 to 50. Optionally, a hindered phenol can be added to the alkylaluminoxane to provide a molar ratio of $Al^1$:hindered phenol of from 2:1 to 5:1 when the hindered phenol is present.

In an embodiment of the disclosure, $R^3$ of the alkylaluminoxane, is a methyl radical and m is from 10 to 40.

The alkylaluminoxanes are typically used in substantial molar excess compared to the amount of group 4 transition metal in the single site catalyst. The $Al^1$:group 4 transition metal molar ratios may be from 5:1 to 10,000:1, such as about 30:1 to 500:1.

It is well known in the art, that the alkylaluminoxane can serve dual roles as both an alkylator and an activator. Hence, an alkylaluminoxane activator is often used in combination with activatable ligands such as halogens.

Alternatively, the activator of the present disclosure may be a combination of an alkylating agent (which may also serve as a scavenger) with an activator capable of ionizing the group 4 metal of the single site catalyst (i.e., an ionic activator). In this context, the activator can be chosen from one or more alkylaluminoxane and/or an ionic activator.

When present, the alkylating agent may be selected from the group consisting of $(R^*)_pMgX^2{}_{2-p}$ wherein $X^2$ is a halide and each $R^*$ is independently selected from the group consisting of $C_{1-10}$ alkyl radicals and p is 1 or 2; R*Li wherein in $R^*$ is as defined previously, $(R^*)_qZnX^2{}_{2-q}$ wherein $R^*$ is as defined previously, $X^2$ is halogen and q is 1 or 2; $(R^4)_sAl^2X^2{}_{3-s}$ wherein $R^*$ is as defined previously, $X^2$ is halogen and s is an integer from 1 to 3. In some embodiments, $R^*$ is a $C_{1-4}$ alkyl radical, and $X^2$ is chlorine. Commercially available compounds include triethyl aluminum (TEAL), diethyl aluminum chloride (DEAC), dibutyl magnesium ((Bu)$_2$Mg), and butyl ethyl magnesium (BuEtMg or BuMgEt).

Organoaluminum Compound

In an embodiment, organoaluminum compounds are defined by the formula:

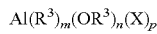

wherein $R^3$ and $R^3$ are each independently $C_1$ to $C_{20}$ hydrocarbyl groups; X is a halide; m+n+p=3; and m≥1.

In an embodiment of the disclosure, the organoaluminum compound used is defined by the formula:

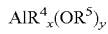

wherein x is from 1 to 3, x+y=3, $R^4$ is a $C_1$ to $C_{10}$ hydrocarbyl group, and $R^5$ is an alkyl or an aryl group.

In particular embodiments, organoaluminum compounds include triethylaluminum, triisobutyl aluminum, tri-n-octylaluminum and diethyl aluminum ethoxide.

Ionic Activator

The ionic activator may be selected from the group consisting of: (i) compounds of the formula $[R^5]^+[B(R^6)_4]^-$ wherein B is a boron atom, $R^5$ is a cyclic $C_{5-7}$ aromatic cation or a triphenyl methyl cation and each $R^6$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^7)_3$; wherein each $R^7$ is independently selected from the group consisting of a hydrogen atom and a $C_{1-4}$ alkyl radical; and (ii) compounds of the formula $[(R^8)_tZH]^+[B(R^6)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with a nitrogen atom may form an anilinium radical and $R^6$ is as defined above; and (iii) compounds of the formula $B(R^6)_3$ wherein $R^6$ is as defined above.

In some embodiments, in the above compounds, preferably $R^6$ is a pentafluorophenyl radical, and $R^5$ is a triphenylmethyl cation, Z is a nitrogen atom and $R^8$ is a $C_{1-4}$ alkyl radical or one $R^8$ taken together with a nitrogen atom forms an anilinium radical (e.g., PhR$^8{}_2$NH$^+$, which is substituted by two $R^8$ radicals such as for example two $C_{1-4}$ alkyl radicals).

Examples of compounds capable of ionizing the single site catalyst include the following compounds: triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra (o,p-dimethylphenyl)boron, tributylammonium tetra(m,m-dimethylphenyl) boron, tributylammonium tetra(p-trifluoromethylphenyl) boron, tributylammonium tetra(pentafluorophenyl)boron, tri (n-butyl)ammonium tetra (o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra (phenyl)boron, triphenylphosphonium tetra)phenyl)boron, tri(m-ethylphenyl)phosphonium tetra(phenyl)boron, tri (dimethylphenyl)phosphonium tetra(phenyl)boron, tropillium tetrakispentafluorophenyl borate, triphenylmethylium tetrakispentafluorophenyl borate, benzene (diazonium) tetrakispentafluorophenyl borate, tropillium phenyltris-pentafluorophenyl borate, triphenylmethylium phenyltrispentafluorophenyl borate, benzene (diazonium) phenyltrispentafluorophenyl borate, tropillium tetrakis (2,3,5,6-tetrafluorophenyl) borate, triphenylmethylium tetrakis (2,3,5,6-tetrafluorophenyl) borate, benzene (diazonium) tetrakis (3,4,5-trifluorophenyl) borate, tropillium tetrakis (3,4,5-trifluorophenyl) borate, benzene (diazonium) tetrakis (3,4,5-trifluorophenyl) borate, tropillium tetrakis (1,2,2- trifluoroethenyl) borate, trophenylmethylium tetrakis (1,2,2-trifluoroethenyl) borate, benzene (diazonium) tetrakis (1,2,2-trifluoroethenyl) borate, tropillium tetrakis (2,3,4,5-tetrafluorophenyl) borate, triphenylmethylium tetrakis (2,3,4,5-tetrafluorophenyl) borate, and benzene (diazonium) tetrakis (2,3,4,5-tetrafluorophenyl) borate.

Commercially available activators which are capable of ionizing the group 4 metal of the single site catalyst include: N,N-dimethylaniliniumtetrakispentafluorophenyl borate ("[Me$_2$NHPh][B(C$_6$F$_5$)$_4$]"); triphenylmethylium tetrakispentafluorophenyl borate ("[Ph$_3$C][B(C$_6$F$_5$)$_4$]"); and trispentafluorophenyl boron and MAO (methylaluminoxane) and MMAO (modified methylaluminoxane).

The ionic activators compounds may be used in amounts which provide a molar ratio of group 4 transition metal to boron that will be from 1:1 to 1:6.

Optionally, mixtures of alkylaluminoxanes and ionic activators can be used as activators in the polymerization catalyst.

Hindered Phenol

Non-limiting example of hindered phenols which may be employed in some embodiments of the present invention include butylated phenolic antioxidants, butylated hydroxytoluene, 2,6-di-tertiarybutyl-4-ethyl phenol, 4,4'-methylenebis (2,6-di-tertiary-butylphenol), 1,3,5-trimethyl-2,4,6-tris (3,5-di-tert-butyl-4-hydroxybenzyl) benzene and octadecyl-3-(3',5'-di-tert-butyl-4'-hydroxyphenyl) propionate.

Catalyst System

The catalyst precursor, the activator, or the entire catalyst composition may be impregnated onto a solid, inert support, in liquid form such as a solution, dispersion or neat liquid, spray dried, in the form of a prepolymer, or formed in-situ during polymerization.

In the case of a supported catalyst composition, the catalyst composition may be impregnated in or deposited on the surface of an inert substrate such as silica, clay, carbon black, polyethylene, polycarbonate porous crosslinked polystyrene, porous crosslinked polypropylene, alumina, thoria, zirconia, or magnesium halide (e.g., magnesium dichloride), such that the catalyst composition is between 0.1 and 90 percent by weight of the total weight of the catalyst composition and the support.

Polymerization Process

In general, the catalyst composition may be used for the polymerization of olefins by any suspension, solution, slurry, or gas phase process, using known equipment and reaction conditions, and is not limited to any specific type of reaction system. Generally, olefin polymerization temperatures range from about 0° C. to about 200° C. at atmospheric, subatmospheric, or superatmospheric pressures. Slurry or solution polymerization processes may utilize subatmospheric or superatmospheric pressures and temperatures in the range of about 40° C. to about 110° C. A useful liquid phase polymerization reaction system is described in U.S. Pat. No. 3,324,095. Liquid phase reaction systems generally comprise a reactor vessel to which olefin monomer and catalyst composition are added, and which contains a liquid reaction medium for dissolving or suspending the polyolefin. The liquid reaction medium may consist of the bulk liquid monomer or an inert liquid hydrocarbon that is nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose are isopentane, hexane, cyclohexane, heptane, benzene, toluene, and the like. Reactive contact between the olefin monomer and the catalyst composition should be maintained by constant stirring or agitation. The reaction medium containing the olefin polymer product and unreacted olefin monomer is withdrawn from the reactor continuously. The olefin polymer product is separated, and the unreacted olefin monomer and liquid reaction medium are recycled into the reactor.

An embodiment of the disclosure is an olefin polymerization process comprising contacting one or more of ethylene and C$_3$ to C$_{10}$ alpha olefins with the olefin polymerization catalyst system described herein under polymerization conditions.

An embodiment of the disclosure is an olefin polymerization process comprising contacting one or more of ethylene and C$_3$ to C$_{10}$ alpha olefins with the olefin polymerization catalyst system described herein under solution phase polymerization conditions.

An embodiment of the disclosure is an olefin polymerization process comprising contacting ethylene and one or more olefins selected from the group consisting of 1-butene; 1-hexene; and 1-octene with the olefin polymerization catalyst system described herein under polymerization conditions.

An embodiment of the disclosure is an olefin polymerization process comprising contacting ethylene and one or more olefins selected from the group consisting of 1-butene; 1-hexene; and 1-octene with the olefin polymerization catalyst system described herein under solution phase polymerization conditions.

Gas Phase Polymerization

When gas phase polymerization is employed, pressures may be in the range of 1 to 1,000 psi, such as 50 to 400 psi, for example 100 to 300 psi, and temperatures in the range of 30° C. to 130° C., for example 65° C. to 110° C. Stirred or fluidized bed gas phase reaction systems are particularly useful. Generally, a conventional gas phase, fluidized bed process is conducted by passing a stream containing one or more olefin monomers continuously through a fluidized bed reactor under reaction conditions and in the presence of catalyst composition at a velocity sufficient to maintain a bed of solid particles in a suspended condition. A stream containing unreacted monomer is withdrawn from the reactor continuously, compressed, cooled, optionally fully or partially condensed as disclosed in U.S. Pat. Nos. 4,588,790 and 5,462,999, and recycled to the reactor. Product is withdrawn from the reactor and make-up monomer is added to the recycle stream. As desired for temperature control of the system, any gas inert to the catalyst composition and reactants may also be present in the gas stream.

Polymerization may be carried out in a single reactor or in two or more reactors in series and is conducted substantially in the absence of catalyst poisons. Organometallic compounds may be employed as scavenging agents for poisons to increase the catalyst activity. Examples of scavenging agents are metal alkyls, including aluminum alkyls, such as triisobutylaluminum.

Conventional adjuvants may be included in the process, provided they do not interfere with the operation of the catalyst composition in forming the desired polyolefin. Hydrogen or a metal or non-metal hydride (e.g., a silyl hydride) may be used as a chain transfer agent in the process. Hydrogen may be used in amounts up to about 10 moles of hydrogen per mole of total monomer feed.

Olefin polymers that may be produced according to the disclosure include, but are not limited to, ethylene homopolymers, homopolymers of linear or branched higher alpha-olefins containing 3 to about 20 carbon atoms, and interpolymers of ethylene and such higher alpha-olefins, with densities ranging from about 0.86 to about 0.96. Suitable higher alpha-olefins include, for example, propylene, 1-butene, 1-pentene, 1-hexene, 4-methyl-1-pentene, 1-octene, and 3,5,5-trimethyl-1-hexene. Olefin polymers according to the disclosure may also be based on or contain conjugated or non-conjugated dienes, such as linear, branched, or cyclic hydrocarbon dienes having from about 4 to about 20 carbon atoms, for example 4 to 12 carbon atoms. In some embodiments, preferred dienes include 1,4-pentadiene, 1,5-hexadiene, 5-vinyl-2-norbornene, 1,7-octadiene, vinyl cyclohexene, dicyclopentadiene, butadiene, isobutylene, isoprene, ethylidene norbornene and the like. Aromatic compounds having vinyl unsaturation such as styrene and substituted styrenes, and polar vinyl monomers such as acrylonitrile, maleic acid esters, vinyl acetate, acrylate esters, methacrylate esters, vinyl trialkyl silanes and the like may be polymerized according to the disclosure as well. Specific olefin polymers that may be made according to the disclosure include, for example, polyethylene, polypropylene, ethylene/propylene rubbers (EPR's), ethylene/propylene/diene terpolymers (EPDM's), polybutadiene, polyisoprene and the like.

Slurry Phase Polymerization

Detailed descriptions of slurry polymerization processes are widely reported in the patent literature. For example, particle form polymerization, or a slurry process where the temperature is kept below the temperature at which the polymer goes into solution is described in U.S. Pat. No. 3,248,179. Slurry processes include those employing a loop reactor and those utilizing a single stirred reactor or a plurality of stirred reactors in series, parallel, or combinations thereof. Non-limiting examples of slurry processes include continuous loop or stirred tank processes. Further examples of slurry processes are described in U.S. Pat. No. 4,613,484.

Slurry processes are conducted in the presence of a hydrocarbon diluent such as an alkane (including isoalkanes), an aromatic, or a cycloalkane. The diluent may also be the alpha olefin comonomer used in copolymerizations. Alkane diluents include propane, butanes, (i.e., normal butane and/or isobutane), pentanes, hexanes, heptanes and octanes. The monomers may be soluble in (or miscible with) the diluent, but the polymer is not (under polymerization conditions). The polymerization temperature can be from about 5° C. to about 200° C. In some embodiments, the polymerization temperature is less than about 120° C., such as from about 10° C. to about 100° C. The reaction temperature is selected so that an ethylene copolymer is produced in the form of solid particles. The reaction pressure is influenced by the choice of diluent and reaction temperature. For example, pressures may range from 15 to 45 atmospheres (about 220 to 660 psi or about 1,500 to about 4,600 kPa) when isobutane is used as diluent to approximately twice that (i.e., from 30 to 90 atmospheres—about 440 to 1,300 psi or about 3,000 to 9,100 kPa) when propane is used (see, for example, U.S. Pat. No. 5,684,097). The pressure in a slurry process must be kept sufficiently high to keep at least part of the ethylene monomer in the liquid phase. The reaction typically takes place in a jacketed closed loop reactor having an internal stirrer (e.g., an impeller) and at least one settling leg. Catalyst, monomers and diluents are fed to the reactor as liquids or suspensions. The slurry circulates through the reactor and the jacket is used to control the temperature of the reactor. Through a series of let down valves the slurry enters a settling leg and then is let down in pressure to flash the diluent and unreacted monomers and recover the polymer generally in a cyclone. The diluent and unreacted monomers are recovered and recycled back to the reactor.

Solution Phase Polymerization

Solution processes for the copolymerization of ethylene and an alpha olefin having from 3 to 12 carbon atoms are well known in the art. These processes are conducted in the presence of an inert hydrocarbon solvent typically a $C_{5-12}$ hydrocarbon which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent which is commercially available is ISOPAR® E ($C_{8-12}$ aliphatic solvent, Exxon Chemical Co.).

In general, a solution polymerization process may use one, two (or more) polymerization reactors.

In an embodiment, the polymerization temperature in at least one CSTR (continuous stirred tank reactor) is from about 80° C. to about 280° C. (e.g., from about 120° C. to 220° C.) and a tubular reactor is operated at a slightly higher temperature. Cold feed (i.e., chilled solvent and/or monomer) may be added to the CSTR(s). The polymerization enthalpy heats the reactor. The polymerization solution which exits in the reactor may be more than 100° C. hotter than the reactor feed temperature. Agitation efficiency in the CSTR may be determined by measuring the reactor temperature at several different points. The largest temperature difference (i.e., between the hottest and coldest temperature measurements) is described as the internal temperature gradient for the polymerization reactor. A very well mixed CSTR has a maximum internal temperature gradient of less than 10° C. An example agitator system is described in commonly assigned U.S. Pat. No. 6,024,483. In some embodiments, preferred pressures are from about 500 psi to 8,000 psi. In some embodiments, the preferred reaction process is a "medium pressure process", which means that the pressure in each reactor is less than about 6,000 psi (about 41,000 kiloPascals or kPa)—for example, from about 1,500 psi to 3,000 psi (about 10,000-21,000 kPa).

If more than one CSTR is employed, catalyst can be added to each of the CSTR(s) in order to maintain a high reactor rate. The catalyst used in each CSTR may be the same or different, but it is generally preferable to use the same type of catalyst in each CSTR. In some embodiments, at least 60 weight % of the ethylene fed to the CSTR(s) is polymerized to polyethylene in the CSTR(s). For example, at least 70 weight % of the ethylene fed to the CSTR(s) can be polymerized to polyethylene in the CSTR(s).

If it is desired to use a mixed catalyst system in which one catalyst is a single site catalyst (for example, where the catalyst is a complex according to this disclosure) and one catalyst is a Ziegler-Natta (Z/N) catalyst, then the single site catalyst can be employed in the first CSTR and the Z/N catalyst can be employed in the second CSTR.

A tubular reactor that is connected to the discharge of the at least on CSTR may also be employed. If two CSTR's are used in series, then the tubular reactor receives the discharge from the second CSTR.

The term "tubular reactor" is meant to convey its conventional meaning: namely a simple tube. The tubular reactor of this disclosure will have a length/diameter (L/D) ratio of at least 10/1. The tubular reactor is not agitated. The tubular reactor can be operated adiabatically. Thus, as polymerization progresses, the remaining comonomer is increasingly consumed and the temperature of the solution increases (both of which improve the efficiency of separating the remaining comonomer from the polymer solution).

The temperature increase along the length of the tubular reactor may be greater than 3° C. (i.e., that the discharge temperature from the tubular reactor is at least 3° C. greater than the discharge temperature from the CSTR that feeds the tubular reactor).

Optionally, the tubular reactor may also have feed ports for additional catalyst, cocatalyst, comonomer and/or telomerization agent (such as hydrogen). However, in some embodiments, preferably no additional catalyst is added to the tubular reactor.

The total volume of the tubular reactor can be at least 10 volume % of the volume of the at least one CSTR, especially from 30% to 200% (for clarity, if the volume of the CSTR is 1,000 liters, then the volume of the tubular reactor is at least 100 liters; for example, from 300 to 2,000 liters).

Addition of Monomers and Solvent

Suitable monomers for copolymerization with ethylene include $C_{3-12}$ alpha olefins which are unsubstituted or substituted by up to two $C_{1-6}$ alkyl radicals. Illustrative non-limiting examples of such alpha-olefins are one or more of propylene, 1-butene, 1-pentene, 1-hexene, 1-octene and 1-decene. In some embodiments, octene-1 is preferred.

In an embodiment, the monomers are dissolved/dispersed in the solvent either prior to being fed to the first CSTR (or for gaseous monomers the monomer may be fed to the reactor so that it will dissolve in the reaction mixture). Prior to mixing, the solvent and monomers are generally purified to remove potential catalyst poisons such as water, oxygen or other polar impurities. The feedstock purification follows standard practices in the art, e.g., molecular sieves, alumina beds and oxygen removal catalysts are used for the purification of monomers. The solvent itself as well (e.g., methyl pentane, cyclohexane, hexane or toluene) can be treated in a similar manner.

Generally, the catalyst components may be premixed in the solvent for the reaction or fed as separate streams to each reactor.

In some instances, premixing may be desirable to provide a reaction time for the catalyst components prior to entering the first CSTR. Such an "in-line mixing" technique is described in the patent literature (most notably U.S. Pat. No. 5,589,555, issued Dec. 31, 1996 to DuPont Canada Inc.).

The residence time in each reactor will depend on the design and the capacity of the reactor. Generally, the reactors can be operated under conditions to achieve a thorough mixing of the reactants. As previously noted, the polymerization reactors are arranged in series (i.e., with the solution from the at least one CSTR being transferred to the tubular reactor).

EXAMPLES

General Experimental Methods

All reactions were performed under purified nitrogen using standard Schlenk techniques or in an inert atmosphere glovebox. All solvents were purified by the system described (Pangborn, A. B.; Giardello, M. A.; Grubbs, R. H.; Rosen R. K.; Timmers, F. J. *Organometallics* 1996, 15, 1518-1520; D. Bradley G. Williams and Michelle Lawton, J. Organic Chemistry, 2010, 75, 8351-8354) and then stored over activated molecular sieves in either a Kontes flask or in an inert atmosphere glovebox (i.e., pentane, heptane, toluene, tetrahydrofuran, dichloromethane). Chloroform was used as received from Sigma Aldrich. Anhydrous methanol and ethanol were distilled from sodium. Phosphorous chloride, adamantane, aluminium chloride, lithium aluminium hydride, silver trifluorormethane sulfonate, 1-adamantol, trimethylsilyl trifluoromethane sulfonate, and cyclopentadienyltitanium trichloride were used as received from Sigma Aldrich. Triethylamine was purchased from Sigma Aldrich and distilled over activated molecular sieves prior to use. Deuterated solvents (tetrahydrofuran-$d_8$, toluene-$d_8$) were purchased from Aldrich and stored over activated 4 Å molecular sieves. Deuterated solvent (acetone-$d_6$, bromobenzene-$d_5$, chloroform-d, dichloromethane-$d_2$, tetrahydrofuran-$d_8$, toluene-$d_8$) were purchased from Cambridge Isotope and stored over activated 4 Å molecular sieves. NMR spectra were recorded on a Bruker 400 MHz spectrometer ($^1$H: 400.1 MHz, $^{19}$F: 376 MHz, $^{31}$P: 162 MHz). Cp*(tBu$_3$PN)Hf(CH$_2$Ph)$_2$ was prepared from Cp*(tBu$_3$PN)HfCl$_2$ (Can. J. Chem. 2009, 87, 1163-1172) and benzyl magnesium chloride.

Molecular weight information ($M_w$, $M_n$ and $M_z$ in g/mol) and molecular weight distribution ($M_w/M_n$), and z-average molecular weight distribution ($M_z/M_w$) were analyzed by gel permeation chromatography (GPC), using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw"). Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four SHODEX® columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with CIRRUS® GPC software. The columns were calibrated with narrow distribution polystyrene standards. The polystyrene molecular weights were converted to polyethylene molecular weights using the Mark-Houwink equation, as described in the ASTM standard test method D6474.

Comonomer Content by Fourier Transform Infrared (FTIR) Spectroscopy: The quantity (mol % (or wt %)) of comonomer in an ethylene interpolymer product was determined by FTIR and reported as the Short Chain Branching (SCB) content having dimensions of CH$_3$ #/1000C (number of methyl branches (or short chain branches, SCB) per 1000 carbon atoms). This test was completed according to ASTM D6645-01 (2001), employing a compression molded polymer plaque and a Thermo-Nicolet 750 Magna-IR Spectrophotometer. The polymer plaque was prepared using a compression molding device (Wabash-Genesis Series press) according to ASTM D4703-16 (April 2016).

Preparation of Bis(1-adamantyl)phosphinic chloride

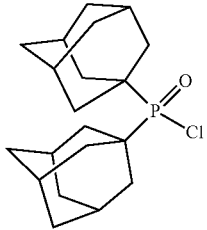 [SMILES: O=P(Cl)(C12CC3CC(CC(C3)C1)C2)C12CC3CC(CC(C3)C1)C2]

At ambient temperature, phosphorous chloride (100 g; 728 mmol) was added to adamantane (27 g; 198 mmol; 1.06 equiv.) and aluminum chloride (25 g, 187 mmol) with a large stir bar for effective stirring. The solution was stirred overnight at 90° C. The reaction was cooled off and the excess phosphorous chloride was removed via distillation. Degassed chloroform (60 mL) was added to form a slurry. The slurry was cooled to 0° C. and degassed water (300 mL) was added dropwise with vigorous stirring for 30 minutes. The slurry was filtered and filtrated was separated. The organic layer was collected. The aqueous layer was extracted with dichloromethane. The chloroform and dichloromethane solutions were combined and dried over $MgSO_4$. A white solid (27.0 g, 41%) was obtained after volatiles were pumped off.

Preparation of Bis(1-adamantyl)phosphine

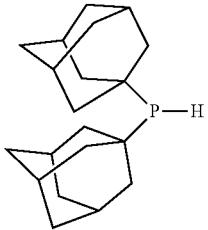 [SMILES: C1C2CC3CC1CC(PC14CC5CC(CC(C5)C1)C4)(C2)C3]

To a solution of the bis(1-adamantyl)phosphinic chloride (27.0 g, 76 mmol) in THF (200 mL) at −40° C. was added lithium aluminium hydride (7.25 g, 191 mmol) as a solid in small portions over 1.5 hours in a glove box. The slurry was allowed to warm to ambient temperature overnight. The solution was filtered to remove the grey solid. The filtrate was pumped to dryness. The product was extract four times with pentane (4×200 mL) and pentane was evaporated to give a white solid (19.7 g, 86%). $^1$H NMR ($CD_2Cl_2$, δ, ppm): 2.78 (d, $J_{PH}$=208 Hz, H), 1.91 (m, 18H), 1.72 (s, 12H). $^{31}P\{^1H\}$NMR ($CD_2Cl_2$, δ, ppm): 17.70 (s).

Preparation of 1-adamantylacetate

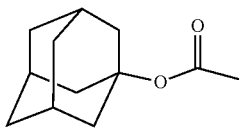

At ambient temperature, silver trifluorormethane sulfonate (0.040 g, 0.16 mmol; 0.01 equivalent) was added to a mixture of 1-adamantanol (2.35 g; 15.4 mmol; 1.00 equiv.) and acetic anhydride (2.2 mL, 23.3 mmol; 1.50 equiv.). The reaction was stirred at 60° C. overnight. The reaction was cooled to ambient temperature and a solution of saturated aqueous sodium bicarbonate (2.5 mL) was added. The reaction was stirred for 30 minutes and extracted with pentane (3×10 mL). The organic layers were combined and dried over $MgSO_4$. The organic layer was filtered and volatiles were removed to give a colourless, clear liquid (0.91 g, 91%). $^1$H NMR ($CD_2Cl_2$, δ, ppm): 2.14 (br, 3H), 2.09 (s, 6H), 1.92 (s, 3H), 1.66 (s, 6H).

Preparation of Tri(1-adamantyl)phosphine

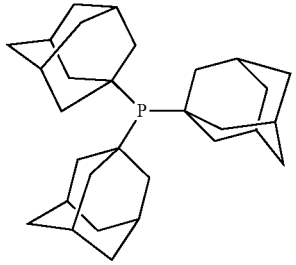 [SMILES: C1C2CC3CC1CC(P(C14CC5CC(CC(C5)C1)C4)C14CC5CC(CC(C5)C1)C4)(C2)C3]

At ambient temperature, trimethylsilyl trifluoromethane sulfonate (8.5 mL; 46.5 mmol; 1.20 equiv.) was added to a solution of bis(1-adamantyl)phosphine (11.75 g; 38.9 mmol; 1.00 equiv.) and 1-adamantylacetate (8.30 g; 46.5 mmol; 1.10 equiv.) in dichloromethane (100 mL). The reaction was allowed to stir at ambient temperature over 24 hours. Trimethylamine (26 mL; 187 mmol; 4.83 equiv.) was added dropwise and the reaction was stirred for 30 minutes. The volatiles were removed in vacuo. The residue was slurried in toluene and filtered off a white solid. The solid was slurried in degassed ethanol and filtered. The white solid was washed with ethanol (3×50 mL) and dried under vacuum to give pure tri(1-adamantyl)phosphine (15.79 g, 93%). $^1$H NMR ($CD_2Cl_2$, δ, ppm): 2.21 (br, 18H), 1.92 (s, 9H), 1.74 (quartet, 18H). $^{31}P\{^1H\}$NMR ($CD_2Cl_2$, δ, ppm): 59.23.

Preparation of N-trimethylsilyl Tri(1-adamantyl)phosphinimine

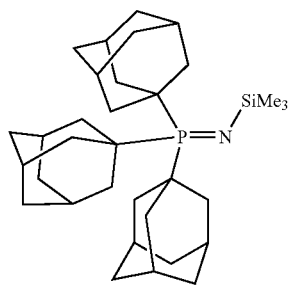 [SMILES: C[Si](C)(C)N=P(C12CC3CC(CC(C3)C1)C2)(C12CC3CC(CC(C3)C1)C2)C12CC3CC(CC(C3)C1)C2]

To a solution of tri(1-adamantyl)phosphine (10.0 g; 23.0 mmol) in toluene (250 mL) at ambient temperature was add trimethylsilylazide (3 mL). The reaction was heated to 90° C. and then 9 mL of trimethylsilylazide was added for a total of 12 mL of trimethylsilylazide (12 mL, 90.4 mmol, 3.95 equiv.). The reaction was heated to reflux at 110° C. for 4 hours. The reaction was cooled to ambient temperature and the volatiles were removed in vacuo to give a white solid (11.45 g, 95%). $^1$H NMR (toluene-d$_8$, δ, ppm): 2.31 (br, 18H), 1.92 (s, 9H), 1.74 (quartet, 18H), 0.47 (s, 9H). $^{31}$P{$^1$H}NMR (toluene-d$_8$, δ, ppm): 19.3 (s).

Preparation of Tri(1-adamantyl)phosphinimine

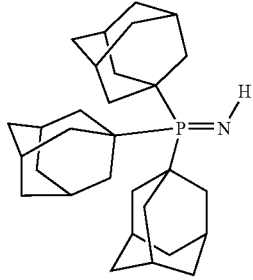 [SMILES: N=P(C12CC3CC(CC(C3)C1)C2)(C12CC3CC(CC(C3)C1)C2)C12CC3CC(CC(C3)C1)C2]

To a solution of Trimethylsilyl tri(1-adamantyl) phosphinimine (7.09 g, 13.5 mmol; 1.00 equiv.) and cesium fluoride (4.26 g, 28.0 mmol; 2.07 equiv.) in THF (200 mL) was added methanol (200 mL) at ambient temperature. The reaction was heated to 60° C. overnight. The reaction was cooled to ambient temperature and the volatiles were removed in vacuo. The white residue was slurried in dichloromethane (25 mL) and filtered via cannula filtration. The solid was washed four times with dichloromethane (4×10 mL). The filtrate was pumped to dryness to offer a white solid (0.99 g, 100%). $^1$H NMR (CD$_2$Cl$_2$, δ, ppm): 2.30 (br, 18H), 1.99 (s, 9H), 1.74 (quartet, 18H), −0.26 (s, 1H). $^{31}$P{$^1$H}NMR (CD$_2$Cl$_2$, δ, ppm): 45.59.

Preparation of Lithium tri(1-adamantyl)phopshinimine Salt

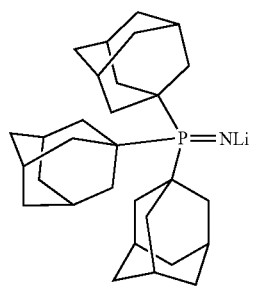

To a slurry of tri(1-adamantyl) phosphinimine (1.63 g; 3.61 mmol) in pentane (60 mL) was added n-butyllithium (1.6 M in hexanes, 2.60 mL, 1.15 equiv.) dropwise over 10 mins at ambient temperature in a glove box. The slurry stirred overnight and cooled in a −35° C. freezer for 5 hours and was filtered. The solid was washed with cold pentane (−35° C., 2×30 mL) and was dried under vacuum (1.53 g). $^1$H NMR (THF-d$_8$, δ, ppm): 2.34 (br.s, 18H), 1.93 (d, 9H), 1.76 (d, 9H) 1.70 (s, 6H). $^{31}$P{$^1$H}NMR (THF-d$_8$, δ, ppm): 42.15 (s).

Preparation of pentamethylcyclopentadienyltri(1-adamantyl)phosphiniminate hafnium dichloride, Cp*(Ad$_3$PN)HfCl$_2$ (Ad=1-Adamantyl; Cp*=pentamethylcyclopentadienyl)

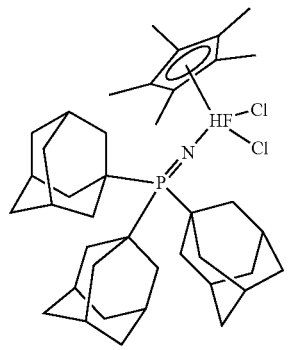

nBuLi (1.6, 1.38 mL, 2.21 mmol) was added to a slurry of tri(1-adamantyl)phosphinimine (0.994 g, 2.20 mmol) in toluene (40 mL) in a glove box. The reaction was stirred at room temperature for 1 hour to produce a slurry of Ad$_3$P=NLi (Ad: 1-adamantyl) in toluene. This slurry of Ad$_3$P=NLi was added slowly to a stirred solution of Cp*HfCl$_3$ in toluene (~30 mL) at −70° C. The reaction was warmed to room temperature and was stirred overnight. LiCl produced was filtered off and the filtrate was concentrated by vacuum pumping to about 10 mL. Product crystallized in about 8 hours. Pentane (10 mL) was added dropwise to the supernatant causing more product to crystallize. The mother liquor was decanted and the solid was washed with pentane/toluene mixture (50/50, 50 mL) and dried under vacuum (1.25 g). $^1$H NMR (toluene-d$_8$, δ, ppm): 2.70-2.30 (very broad s., 18H), 2.26 (s, 15H), 1.95 (broad s, 9H), 1.84-1.67 (very broad s, 6H), 1.615 (broad doublet, 9H, J=9 Hz). $^{31}$P{$^1$H}NMR (toluene-d$_8$, δ, ppm): 29.8 (s).

Preparation of dimethyl pentamethylcyclopentadienyl tri(1-adamantyl)phosphiniminate hafnium

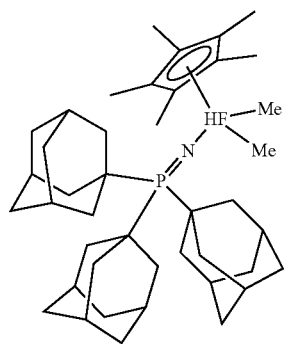

To a solution of Cp*(1-Ad$_3$PN)HfCl$_2$ (644 mg; 0.77 mmol) in toluene (20 mL) was added methylmagnesium bromide (0.90 mL; 2.70 mmol; 3.50 equiv.; 3.0 M in diethyl ether) at ambient temperature. The mixture was stirred for 2 hours followed by vacuum solvent removal. The residue was triturated in toluene (20 mL) and reduced to dry under vacuum. Toluene (50 mL) was added, and the slurry mixture was filtered. White, fine solid (594 mg, 97%) was collected via recrystallization from the filtrate. $^1$H NMR (toluene-d$_8$, δ, ppm): 2.43 (s, broad, 18H), 2.16 (s, 15H), 1.96 (s, broad, 9H), 1.69 (dd, J=50.2 Hz, 18H), −0.03 (s, 6H). $^{31}$P{$^1$H}NMR (toluene-d$_8$, δ, ppm): 25.06 (s).

Preparation of dibenzyl pentamethylcyclopentadienyl tri(1-adamantyl)phosphiniminate hafnium

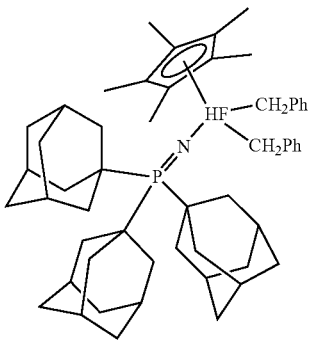

Benzylmagnesium chloride in diethyl ether (1.0 M, 5 mL, 5 mmol) was added to a toluene solution of Cp*(1-Ad$_3$PN) HfCl$_2$ (1.4 g, 1.68 mmol) in toluene (30 mL) at room temperature. The mixture was stirred overnight and was pumped to dryness. Toluene (30 mL) was added to the residue to make a slurry which was filtered to remove solid. The solid was rinsed with toluene (10 mL). The filtrate was pumped to dryness and toluene (30 mL) was added to make a solution, which was pumped to dryness again. Toluene (30 mL) was added again to the solid to make a solution, which was filtered to remove very small amount of solid. The filtrate was concentrated to about 5 mL and heptane was added. Product crystallized as a white solid at −35° C. (0.74 g). $^1$H NMR (toluene-d$_8$, δ, ppm): 2.43 (s, broad, 18H), 2.16 (s, 15H), 1.96 (s, broad, 9H), 1.69 (dd, J=50.2 Hz, 18H), −0.03 (s, 6H). $^{31}$P{$^1$H}NMR (toluene-d$_8$, δ, ppm): 25.06 (s).

Preparation of bis(3,5-dimethyl-1-adamantyl) Phosphine, (3,5-Me$_2$-1-Ad)$_2$PH)

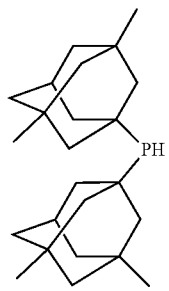

1,3-dimethyladamantane (10 g, 60.86 mmol) and AlCl$_3$ (9.5 g, 71 mmol) were weighed into a 150 mL Schlenk flask with a large stir bar. PCl$_3$ (40 mL) was added to the flask. The mixture was stirred and was heated to 90° C. overnight. An orange slurry produced. The excess PCl$_3$ was distilled out at 115-120° C. The flask was cooled to room temperature and degassed chloroform (100 mL) was added. The flask was cooled to 0° C., and degassed water (20 mL) was added under nitrogen dropwise from a syringe over about 1 hour. An additional 15 mL of water was added to the quenched reaction. The content was filtered through a medium glass frit in air and the solid was rinsed with dichloromethane (~50 mL). The orange filtrate was collected, dried with anhydrous magnesium chloride, and was filtered. The dried filtrate was pumped to dryness to give crystalline (3,5-Me$_2$-1-Ad)$_2$P(O)Cl (15.77 g) which was used as is in the next reaction.

The product from the last reaction was dissolved in THF (150 mL). The solution was cooled to −10° C. in a glove box. LiAlH$_4$ (3.5 g, excess) in THF (~50 mL) was added from a dropping funnel in about 1 hour. The reaction was stirred overnight. The next morning, the temperature was raised to 40° C. for 2 hours. The solvent was pumped off. The residue was extracted with pentane (3×100 mL) and the pentane solution was pumped to dryness to give the product, 3,5-Me$_2$-1-Ad)$_2$PH, as a crystalline solid (8.0 g). $^1$H NMR (toluene-d$_8$, d, ppm): 2.92 (d, J=201.64 Hz, 1H), 1.97-1.89 (m, 2H), 1.87-1.68 (m, 4H), 1.65-1.55 (m, 4H), 1.55-1.44 (m, 4H), 1.32-1.15 (m, 8H), 1.01 (s, 4H), 0.78 (s, 12H). $^{31}$P NMR (toluene-d$_8$, d, ppm): 14.70 (s).

Preparation of (1-adamantyl)bis(3,5-dimethyl-1-adamantyl)Phosphine, (1-Ad) (3,5-Me$_2$-1-Ad)$_2$P

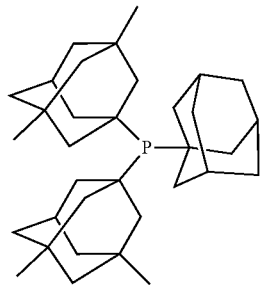 [SMILES: CC12CC3CC(C)(C1)CC(P(C14CC5CC(CC(C5)C1)C4)C14CC5CC(C)(CC(C)(C5)C1)C4)(C3)C2]

Bis(3,5-dimethyl-1-adamantyl) Phosphine (13.95 mmol) and 1-adamantylacetate (2.87 g, 14.78 mmol) were weighed into a 250 mL round bottomed flask, in which 50 mL of dichloromethane was added. Trimethylsilyl trifluoromethanesulfonate (3.38 g, 15.20 mmol) was added. The solution was stirred for 24 hours and triethylamine (7.05 g, 70 mmol) was added to the solution. The solution was stirred for 0.5 hours and was pumped to dryness. The solid was extracted with degassed ethanol at 65° C. (3×100 mL) and was filtered. The solid (which was not soluble in EtOH) was dried under vacuum (3.50 g, 51% yield). $^1$H NMR (toluene-d$_8$, d, ppm): 2.37 (br.s, 8H), 2.17 (br.s, 6H), 1.97 (dd, J=33 Hz, J=15 Hz, 15H), 1.73 (dd, J=45, J=12 Hz, 7H), 1.32 (dd, J=35 Hz, J=12 Hz, 7H), 1.075 (dd, J=30, J=10, 10H), 0.847 (s, 12H). $^{31}$P NMR (toluene-d$_8$, d, ppm): 55.9 (s).

Preparation of (1-adamantyl)bis(3,5-dimethyl-1-adamantyl)(N-trimethylsilyl)phosphinimine, (1-Ad)(3,5-Me$_2$-1-Ad)$_2$)P=NSiMe$_3$

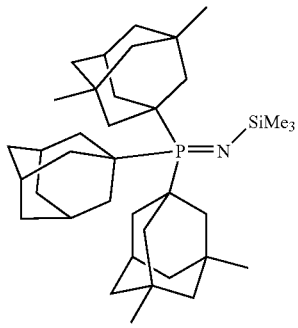 [SMILES: CC12CC3CC(C)(C1)CC(P(=N[Si](C)(C)C)(C14CC5CC(CC(C5)C1)C4)C14CC5CC(C)(CC(C)(C5)C1)C4)(C3)C2]

(1-Adamantyl)bis(3,5-Me$_2$-1-adamantyl)$_2$phosphine (3.50 g, 7.10 mmol) was weighed into a 250 mL Schlenk flask. Toluene (~70 mL) and trimethylsilyl azide (3.0 mL, 21.3 mmol) were added. The mixture was heated at 110° C. for 6 hours and the contents were pumped to dryness to give a foam which solidified to give a white solid (quantitative yield). $^1$H NMR (toluene-d$_8$, d, ppm): 2.361 (br.s, 8H), 2.159 (br.s, 5H), 2.08-1.89 (m, 14H), 1.69 (dd, J=44 Hz, J=12 Hz, 8H), 1.29 (dd, J=51 Hz, J=12 Hz, 11H), 1.065 (dd, J=33 Hz, J=13 Hz, 6H), 0.854 (s, 12H), 0.450 (s, 9H). $^{31}$P NMR (toluene-d$_8$, d, ppm): 18.7 (s).

Preparation of (1-adamantyl)bis(3,5-dimethyl-1-adamantyl)phosphinimine, (1-Ad) (3,5-Me$_2$-1-Ad)$_2$)P=NH

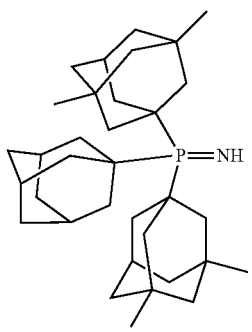 [SMILES: CC12CC3CC(C)(C1)CC(P(=N)(C14CC5CC(CC(C5)C1)C4)C14CC5CC(C)(CC(C)(C5)C1)C4)(C3)C2]

(1-Adamantyl)bis(3,5-dimethyl-1-adamantyl)(N-trimethylsilyl)phosphinimine (1-Ad'$_2$)(1-Ad)P=NSiMe$_3$ (0.985 g, 1.70 mmol) was weighed into a 100 mL Schlenk flask. THF (40 mL) was added. Dry CsF (0.90 g, 5.9 mmol) was weighed into a 50 mL hypo vial to which 35 mL degassed absolute MeOH was added to dissolve the CsF. The methanol solution was transferred to the Schenk flask and the mixture was stirred at 60° C. under 3 psi of nitrogen for 6 hours. The solution was pumped to dryness and the residue was extracted with 80 mL of pentane. The pentane solution was filtered, and the filtrate was pumped to dryness to give 0.80 g pure product. $^1$H NMR (toluene-d$_8$, d, ppm): 2.41 (br.s, 6H), 2.21 (br.s, 4H), 2.08-1.96 (m, 10H), 1.91 (br.s, 3H), 1.68 (dd, J=42 Hz, J=13 Hz, 6H), 1.273 (dd, J=57 Hz, J=13 Hz, 9H), 1.04 (dd, J=30 Hz, J=13 Hz, 4H), 0.836 (s, 12H), −0.45 (v.br.s, 1H). $^{31}$P NMR (toluene-d$_8$, d, ppm): 41.6 (s).

Preparation of (pentamethylcyclopentadienyl)(1-adamantyl)bis(3,5-dimethyl-1-adamantyl)phosphiniminate zirconium dichloride, Cp*[(1-Ad)(3,5-Me2-1-Ad)$_2$PN]ZrCl$_2$

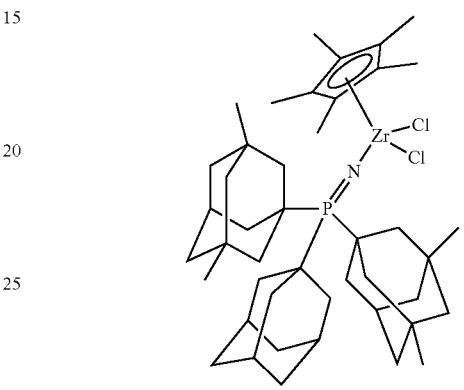

[(1-Ad'$_2$)(1-Ad)P=NH (1.085 g, 2.13 mmol) (1-Ad' is 3,5-dimethyl-1-adamantyl) was weighed in a 100 mL hypo vial and toluene (40 mL) was added. nBuLi in hexanes (1.6 M, 1.45 mL) was added dropwise to the stirred slurry. In about 10 minutes, the slurry became a clear solution which was stirred overnight.

Pentamethylcyclopentadienylzirconium trichloride (0.709 g, 2.13 mmol) was weighed into a 100 mL Schlenk flask and toluene (25 mL) was added. The solution was stirred for about 10 minutes and was cooled to −78° C. for 0.5 hours. The solution in the hypo vial containing [(1-Ad'$_2$)(1-Ad)P=NLi was transferred dropwise to the Schlenk flask through a 20-gauge cannula over 10 minutes. The vial was rinsed with toluene (2×4 mL) and the toluene washings was added to the Schlenk flask. After the reaction was stirred at −78° C. for about 10 minutes, the cold bath was removed, and the reaction was stirred at room temperature for 24 hours. No precipitate was observed. At about 28 hours, the solution started to turn cloudy. The reaction was stirred for an additional 3 hours and the solution was filtered through celite to remove LiCl. The filtrate was pumped to remove toluene and a thick oil was obtained. Pentane (about 5 mL) was added until the solution became cloudy. The solution was put in a −35° C. freezer overnight and the product solidified. The mother liquor was pipetted out and the solid was washed with pentane to give 1.39 g white solid. $^1$H NMR (toluene-d$_8$, d, ppm): 2.8-2.3 (br.s, 8H), 2.24 (s, 15H), 2.20 (s, 1H), 2.12 (s, 2H), 2.02 (br. s, 5H), 1.94 (br.s, 4H), 1.87-1.66 (br. m, 3H), 1.65-1.55 (br. s, 4H), 1.43-1.30 (br.s, 3H), 1.30-1.15 (Br. m, 7H), 1.07-0.98 (m, 3H), 0.897 (br. s, 12H). $^{31}$P NMR (toluene-d$_8$, d, ppm): 25.6 (s).

Preparation of dibenzyl(pentamethylcyclopentadienyl)(1-adamantyl)bis(3,5-dimethyl-1-adamantyl)phosphiniminate zirconium, Cp*[(1-Ad)(3,5-Me2-1-Ad)$_2$PN]Zr(CH$_2$Ph)$_2$

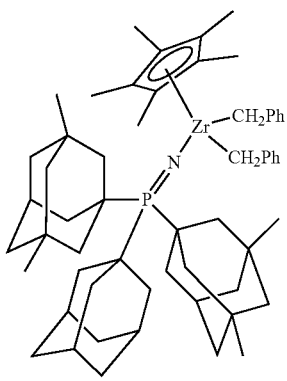

A solution of Cp*[(1-Ad)(1-Ad'$_2$)PN]ZrCl$_2$ (1.29 g, 1.604 mmol) in toluene (30 mL) was chilled in a −35° C. freezer for 0.5 hours. PhCH$_2$MgCl in Et$_2$O (1 M, 3.7 mL) was added to the solution. The mixture was stirred overnight and was filtered. The filtrate was pumped to dryness and toluene (10 mL) was added to dissolve the solid. A small amount of solid was filtered off and the filtrate was pumped to dryness again. Pentane (~10 mL) was added to dissolve the solid. The turbid pentane solution was filtered off to remove solid and the clear filtrate was pumped to about 5 mL. Product did not crystallize at −35° C. The solution was pumped to make sure all toluene was removed. The solid (1.20 g) was very soluble in pentane. $^1$H NMR (toluene-d$_8$, d, ppm): 7.21-6.82 (m, 10H), 2.57-2.32 (br. s, 8H), 2.29-2.17 (m, 7H), 2.16-2.13 (br.m, 3H), 2.12 (s, 2H), 2.06-2.01 (br. s, 5H), 1.97 (s, 15H), 1.95-1.90 (br. s, 3H), 1.84-1.55 (br. m, 7H), 1.48-1.14 (br.m, 12H), 1.06-0.99 (m, 3H), 0.94-0.84 (br.s, 12H). $^{31}$P NMR (toluene-d$_8$, d, ppm): 21.3 (s).

Preparation of (pentamethylcyclopentadienyl)(1-adamantyl)bis(3,5-dimethyl-1-adamantyl)phosphiniminate hafnium dichloride, Cp*[(1-Ad)(3,5-Me$_2$-1-Ad)$_2$PN]HfCl$_2$

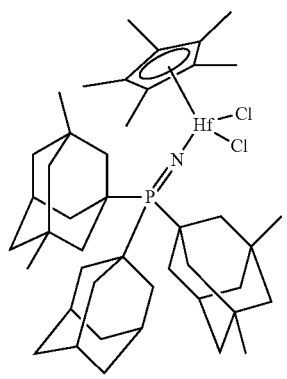

nBuLi (1.6 M, 1.35 mL, 2.16 mmol) was added to a toluene solution (30 mL) of (1-Ad)(1-Ad'$_2$)P=NH (1.00 g, 1.97 mmol) at room temperature. The solid dissolved very quickly after the addition. The solution was stirred for 2 hours and was added to a slurry of Cp*HfCl$_3$ (0.838 g, 1.97 mmol) in toluene (40 ml) at −70° C. The resulted clear solution was allowed to warm to room temperature and was stirred over a weekend. The cloudy solution was filtered to remove the fine solid and the filtrate was pumped to dryness. The residue was thoroughly extracted with pentane (3×10 mL). A small amount of pentane insoluble solid was found to be the ligand (1-Ad)(1-Ad'$_2$)P=NH. The pentane solution was pumped to dryness. $^1$H NMR (toluene-d$_8$, d, ppm): 2.7-2.3 (v.br.s, 8H), 2.26 (s, 15H), 2.03 (br.s, 5H), 1.94 (br.s, 5H), 1.63-1.69 (v.br, 3H), 1.61 (br.d., 4H), 1.43-1.13 (br. m, 13H), 1.02 (br.d, 3H), 0.90 (multiple s, 12H). $^{31}$P NMR (toluene-d$_8$, d, ppm): 29.2 (s).

Preparation of dibenzyl(pentamethylcyclopentadienyl)(1-adamantyl)bis(3,5-dimethyl-1-adamantyl)phosphiniminate hafnium, Cp*[(1-Ad)(3,5-Me$_2$-1-Ad)$_2$PN]Hf(CH$_2$Ph)$_2$

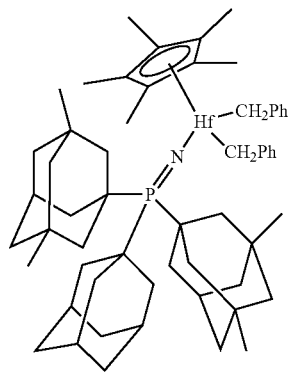

The solid from the above reaction was dissolved in toluene (35 mL). PhCH$_2$MgCl (1.0 M in diethyl ether, 7 mL) was added. The mixture was stirred overnight and was pumped to dryness. The foamy solid was extracted with pentane (150 mL). The pentane solution was filtered, and the volume was reduced to about 50 mL by vacuum pumping. The turbid solution was filtered, and the clear filtrate was pumped to dryness. The solid was re-dissolved in pentane. Some small amount of solid did not dissolve, which was filtered off. The filtrate was pumped to dryness to give 1.47 g of product. $^1$H NMR (toluene-d$_8$, d, ppm): 7.24-7.10 (m, 7H). 6.92-6.84 (m, 2H), 6.80-6.70 (m, 1H), 2.60-2.32 (br.s, 6H), 2.23 (m, 5H), 2.06-2.01 (br.s, 4H), 1.99 (s, 15H), 1.96-1.89 (br.m, 4H), 1.78-1.67 (br.m, 5H), 1.66-1.57 (br.m, 4H), 1.44-1.26 (br.m, 9H), 1.26-1.16 (br.d, 5H), 1.07-1.0 (br.d, 3H), 0.89 (slightly br.s, 12H). $^{31}$P NMR (toluene-d$_8$, d, ppm): 26.2 (s).

Preparation of dibenzyl(pentamethylcyclopentadienyl)(tri(1-adamantyl)phosphiniminate) zirconium, Cp*(1-Ad₃PN)ZrBn₂

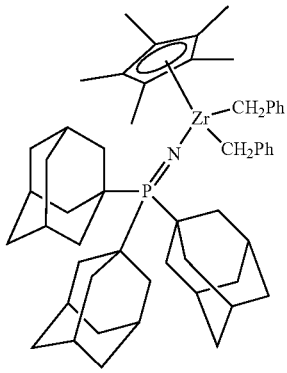

A toluene solution of Cp*Zr(CH₂Ph)₃ in a 20 mL hypo vial was added to a slurry of 1-Ad₃P=NH in toluene (~15 mL) in a 100 mL Schlenk flask at −70° C. The hypo vial was rinsed with toluene (2×3 mL) and the rinsing solution was added to the Schlenk flask. The reaction mixture was allowed to warm to room temperature with the cold bath and was stirred overnight. The solution was pumped to dryness. ¹H NMR showed small amount of Cp*Zr(CH₂Ph)₃ in addition to the product (from the peak of Cp* methyl signal). ³¹P NMR showed a singlet (product) and a very small amounts of impurities. The solid was re-dissolved in toluene and the volume of the solution was reduced to about 5 mL by vacuum pumping. Pentane (5 mL) was added dropwise to the toluene solution which was put in a −35° C. freezer. Product did not crystallize. More pentane (~5 mL) was added to the solution and the solution was again put in the freezer overnight. Product crystallized. The mother liquor was separated. The solid was washed with pentane (2×5 mL) and was dried under vacuum (0.45 g). ¹H NMR (toluene-d₈, d, ppm): 7.19-7.11 (m, 8H), 6.87-6.81 (m, 2H), 2.38-2.23 (m, 22H), 1.99 (s, 15H), 1.94 (br.s, 10H), 1.81-1.67 (br. m, 9H), 1.66-1.59 (br.d, 10H). ³¹P NMR (toluene-d₈, d, ppm): 22.3 (s).

Preparation of 2,3,4,5-tetramethyl[1-(3,5-di-tert-butyl)]cyclopentadiene, 3,5-tBu₂Ph-Me₄CpH

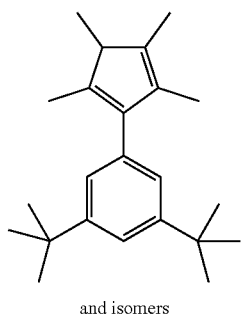 [SMILES: CC1=C(C)C(C)C(C)=C1c1cc(C(C)(C)C)cc(C(C)(C)C)c1]

and isomers 1-bromo-3,5-di-tbutylbenzene (2.69 g, 10 mmol) in THF (10 mL) was added in small portions to a 350 mg of activated magnesium turnings (14.6 mmol) in THF (3 mL). Reaction started in about 5 minutes as the color of the solution turned to a tint of brown. THF (~15 mL) was added to the reaction flask and the remaining 1-bromo-3,5-di-tert-butylbenzene in THF was added gradually. The reaction temperature was maintained at 50° C. and was stirred for 6 hours to afford the Grignard reagent. The solution was filtered to remove unreacted magnesium (which was disposed as pyrophoric solid) and the filtrate was added to a THF solution (30 mL) of 1,2,3,4-trtramethylcyclopenten-1-one. After being stirred at room temperature for 1 hour, the reaction solution was heated at 70° overnight. The solution was cooled to room temperature and was added to a stirred HCl aqueous solution (15 mL). After one hour, the product was worked up with diethyl ether extraction to afford 2.8 g of the 3,5-di-t-butylpheny-tetramethylcycloentadiene isomers.

Preparation of 2,3,4,5-tetramethyl[1-(3,5-di-tert-butylphenyl)]cyclopentadienyl hafnium trichloride, (2,3,4,5-Me₄)(3,5-tBu₂Ph)CpHfCl₃

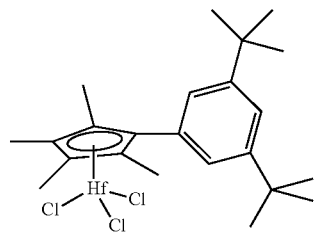

3,5-di-t-butylpheny-tetramethylcycloentadiene (3.50 g, 10.8 mmol) was weighed in a 100 mL round bottomed flask in a glove box. Diethyl ether (50 mL) was added. Benzyl potassium (1.406 g, 10.8 mmol) was added in small portions to the solution. Immediate precipitate was observed. After stirring the reaction for 1.5 hours, the slurry was filtered to remove any diethyl ether-soluble by-products. The solid was rinsed with diethyl ether (2×5 mL) and pentane (10 mL) and was dried under vacuum. The solid was dissolved in THF (30 mL) and Me₃SiCl (2.0 g, 18.4 mmol) was added. The solution was stirred overnight and was pumped to dryness. Note: KCl dissolved in the product. Pentane (30 mL) was added to the liquid, lots of precipitate (KCl) was observed, which was filtered off and the pentane filtrate was pumped to dryness to give a viscous oil of 3,5-tBu₂Ph-Me₄Cp-SiMe₃.

The product from the previous reaction (1.015 g, 2.652 mmol) was dissolved with heptane (~20 mL). The solution was added to a 100 mL round bottomed flask with HfCl₄ (0.860 2.68 mmol). The slurry was heated to 70° C. overnight. The white slurry changed to almost homogeneous dull red solution. Heptane was removed by vacuum pumping and the solid was extracted with pentane (30 mL). The pentane solution was filtered to remove a small amount of solid and the filtrate was reduced to about 3 mL. Product crystallized at −35° C. overnight (1.173 g). ¹H NMR (toluene-d₈, d, ppm): 7.50 (s, 1H), 7.32 (s, 2H), 2.25 (s, 6H), 2.00 (s, 6H), 1.32 (s, 18H).

(2,3,4,5-tetramethyl[1-(3,5-di-tert-butylphenyl)]cy-clopentadienyl)(tri(1-adamantyl)phosphiniminate) hafnium dichloride, (3,5-tBu₂Ph-Me₄Cp)(1-Ad₃PN)HfCl₂

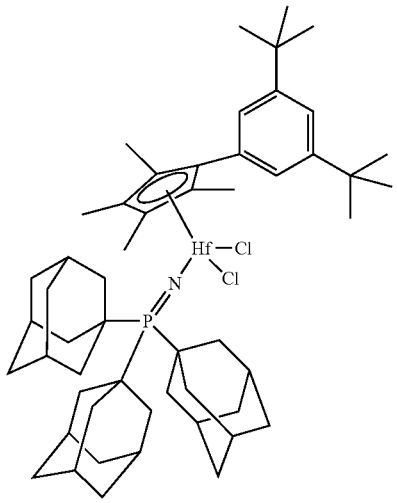

A solution of (3,5-tBu₂Ph-Me₄Cp)HfCl₃ (1.934 g, 3.25 mmol) in toluene (30 mL) was added to a slurry of (1-Ad)₃P=NLi (1.48 g, 3.25 mmol) in toluene (30 mL) at −70° C. The slurry was stirred at −70° C. for 5 minutes and the cold bath was removed. The reaction was stirred at room temperature for 24 hours. The solution was filtered to remove LiCl and the filtrate was concentrated by vacuum pumping to about 2 mL. 2 mL of pentane was added dropwise. The solution was left in a −35° C. freezer overnight and the product crystallized. The mother liquor was pipetted out. The solid was washed with cold toluene (−35° C., 2×5 mL), then with pentane (1×10 mL) and was dried under vacuum. 2.50 g of very crystalline solid was obtained. ¹H NMR (toluene-d₈, d, ppm): 7.61 (s, 2H), 7.40 (s, 1H), 2.53 (s, 6H), 2.28 (s, 6H), 2.47-2.18 (v.br s, 18H), 1.87 (br.s, 10H), 1.77-1.53 (m, 17H), 1.39 (s, 18H). ³¹P NMR (toluene-d₈, d, ppm): 29.4 (s).

Dimethyl(2,3,4,5-tetramethyl[1-(3,5-di-tert-butylphenyl)]cyclopentadienyl)(tri(1-adamantyl) phosphiniminate) hafnium, (3,5-tBu₂Ph-Me₄Cp)(1-Ad₃PN)HfMe₂

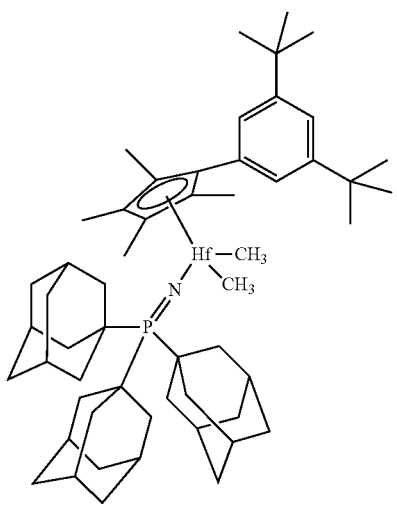

(3,5-tBu₂Ph-Me₄Cp)(1-Ad₃PN)HfCl₂ (0.907 g, 0.9 mmol) was dissolved in toluene (125 mL). To this solution was added CH₃MgBr solution (3 M in Et₂O, 1.4 mL). After stirring the reaction mixture for 2 hours, the solution became turbid. Stirring continued overnight. The solution was pumped to remove diethyl ether and was filtered to remove the suspended solid. The filtrate was pumped to dryness. Toluene (50 mL) was added to dissolve the product. The solution was filtered to remove a small amount of solid and the filtrate was pumped to dryness. The above process was repeated. Crystalline solid (0.460 g) was obtained after the solution was pumped to dryness. ¹H NMR (toluene-d₈, d, ppm): 7.42 (br.s, 3H), 2.42 (s, 6H), 2.40 (br.s, 16H), 1.93 (br. 9H), 1.87 (br. m, 10H), 1.64 (dr.d, 10H), 1.41 (s, 18H), 0.19 (s, 6H). ³¹P NMR (toluene-d₈, d, ppm): 24.9 (s).

Preparation of trans-2-methyl-2-butenoyl chloride

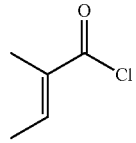

A solution of oxalyl chloride (6.47 g, 51 mmol) in CH₂Cl₂ (40 mL) was added dropwise through a 20-gauge cannula to a solution of trans-2-methyl-2-butenoic acid (5.005 g, 50 mmol) in CH₂Cl₂ (30 mL). The addition took 20 minutes. Gas evolution was observed, which was vented out through a 20-gauge cannula on the septum to a sodium hydroxide solution (4 M, ~200 mL). The reaction became cloudy, which was stirred overnight while a steady small stream of nitrogen flowed through the septum to the top of the reaction flask then out through a 20-gauge cannula to the sodium hydroxide solution. The CH₂Cl₂ was carefully distilled out from the reaction flask. Pentane (30 mL) was added to the flask to dissolve the product. The undissolved solid (the starting material) was filtered off. Pentane was removed by distillation from the filtrate. The product was a clear liquid (which was used for the next reaction without being weighed). ¹H NMR (toluene-d₈, d, ppm): 6.86 (qq, J₁=7.0 Hz, J₂=1.3 Hz), 1.45 (pentet, J=1.1 Hz, 3H), 1.18 (dq, J₁=7.0 Hz, J₂=1.3 Hz).

Preparation of 1,4-Dihydro-1,2-dimethyl-4-phenyl-cyclopent[b]indol-3(2H)-one

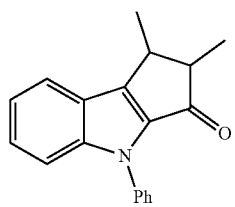 [SMILES: CC1C(=O)c2c(c3ccccc3n2-c2ccccc2)C1C]

N-Phenylindole (8.503 g, 44 mmol) prepared by the method reported in Syn. Lett. 2019, 30(11), 1313-1316 was dissolved in THF (150 mL). nBuLi (1.6 M, 28.3 mL) was very slowly added in 2 hours to this solution maintained at −13° C. with an ethanol/dry ice bath. The cold bath was removed, and the reaction was stirred for 15 minutes and then cooled to −30° C. with an ethanol/dry ice bath. A THF solution (80 mL) of ZnCl$_2$ was added. The solution was stirred and warmed to room temperature in 40 minutes.

A solution of Pd(PPh$_3$)$_4$ (1 mmol %, 0.51 g) in THF (30 mL) was added through a cannula followed with adding trans-2-methyl-2-butenoyl chloride (5.34 g, mmol). The mixture was stirred overnight and was pumped to dryness. The reaction residue was extracted with diethyl ether (4×200 mL) and the diethyl ether solution was washed with saturated NaCl solution (3×50 mL). The diethyl ether solution was dried with anhydrous MgSO$_4$ and was pumped to remove volatiles to give a thick oil.

The thick oil was dissolved in CH$_2$Cl$_2$ (800 mL) and 0.260 g of CF$_3$SO$_3$H was added in 10 mL of CH$_2$Cl$_2$. The reaction was stirred for 1.5 hours and the CH$_2$Cl$_2$ removed by using a rotovap. The thick oil thus obtained was dissolved in pentane/diethyl ether (10:1, 200 mL). The solution was passed through an 18" column of alumina (f=0.5") and the column was flushed with additional 600 mL of the mixed solvents. The volatiles from the filtrate were removed using a rotovap to give an orange oil. $^1$H NMR showed it was 100% pure (two isomers ~1:0.5 ratio, 11.0 g). $^1$H NMR (toluene-d$_8$, d, ppm): 7.72-7.64 (m, 1.5H), 7.49 (7.35 (m, 8H), 7.32-7.2 (m, 3H), 7.16-7.08 (m, 2H), 7.08-7.01 (m, 0.5H), 3.58 (pentet, J=7 Hz, 0.5H), 3.08 (pentet, 0.5H), 3.02 (dq, J$_1$=7 Hz, J$_2$=2.5 Hz, 1H), 2.48 (dq, J$_1$=7 Hz, J$_2$=2.5 Hz, 1H), 1.47 (d, J=7 Hz, 3H), 1.31 (d, J=7 Hz, 1.5H), 1.26 (d, J=7 Hz, 3H), 1.16 (d, J=7 Hz, 1.5H).

Preparation of 1,2,3-trimethyl-4-phenyl-1,4-dihydrocyclopent[b]indole

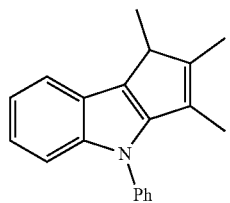 [SMILES: CC1=C(C)C(C)c2c1n(-c1ccccc1)c1ccccc21]

CH$_3$MgCl in THF (3.0 M, 10 mL) was added to a solution 1,4-Dihydro-1,2-dimethyl-4-phenylcyclopent[b]indol-3 (2H)-one (5.42 g, 19.68 mmol) in THF (100 mL). The reaction was heated to 58° C. overnight. Lots of solid precipitated. The slurry was carefully pipetted to a 150 mL of aqueous HCl (total amount of HCl, 100 mmol) and the solution was stirred for 2 hours. The organic phase was separated, and the aqueous layer was extracted with diethyl ether (3×50 mL). The combined organic phases were washed with saturated NaCl solution (80 mL), dried with anhydrous MgSO$_4$ and was pumped to dryness. The thick oil was dissolved in pentane (~100 mL), the solution was passed through an alumina column (12", f=0.5") and was rinsed with 400 mL of pentane. The filtrate was evaporated to dryness producing a light orange oil (4.77 g). Note: The product decomposes in CDCl$_3$ and with dry HCl. $^1$H NMR (acetone-d$_6$, d, ppm): 7.65-7.57 (m, 3H), 7.57-7.48 (m, 4H), 7.13-7.10 (m, 1H), 7.09-7.05 (m, 1H), 6.98-6.93 (m, 1H), 2.00 (s, 3H), 1.68 (s, 3H), 1.38 (d, J=7 Hz, 3H).

Preparation of 1,2,3-trimethyl-1-trimethylsilyl-4-phenyl-4-hydrocyclopent[b]indole

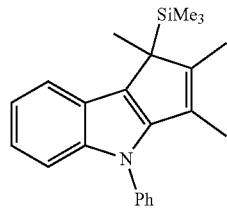 [SMILES: CC1=C(C)C(C)([Si](C)(C)C)c2c1n(-c1ccccc1)c1ccccc21]

To a stirred solution of 1,2,3-trimethyl-4-phenyl-1,4-dihydrocyclopent[b]indole (2.217 g, 8.11 mol) in diethyl ether (35 mL) was added benzyl potassium (1.06 g, 8.11 mmol). The yellow orange slurry gradually became red and benzyl potassium gradually slowly disappeared. In about 40 minutes, all the benzyl potassium disappeared. The solution became turbid and red solid formed. The slurry was stirred for 2.5 hours and was pumped to dryness. The solid was washed with pentane. The solid was dissolved in THF (40 mL) to form a very dark red solution. Me$_3$SiCl (1.2 g, 11 mmol, excess) in THF (10 mL) was added to the above solution. The dark color disappeared to became almost colorless. The solution was left stirring overnight and was pumped to dryness. The residue was extracted with pentane (50 mL) and the pentane solution was pumped to dryness to give the target product as a colorless oil (without weighing, used in the next step). $^1$H NMR (CD$_2$Cl$_2$, d, ppm): 7.58-7.52 (m, 3H), 7.47-7.40 (m, 3H), 1.21-7.17 (d, J=7 Hz, 1H), 7.07 (t, J=7 Hz, 1H), 7.01-6.96 (m, 1H), 2.00 (s, 3H), 1.72 (s, 3H), 1.58 (s, 3H), 0.05 (s, 9H).

Preparation of 1,2,3-trimethyl-4-phenyl-4-hydrocyclopent[b]indolylhafnium trichloride

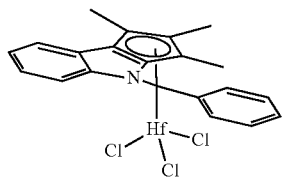

To 1,2,3-trimethyl-1-trimethylsilyl-4-phenyl-4-hydrocyclopent[b]indole prepared in the last step in a 100 mL round bottomed flask was dissolved in toluene (40 mL). HfCl$_4$ (2.6 g, 8.1 mmol) was added to the flask from a hypo vial. The mixture was heated to 90° C., the solution became orange and the HfCl$_4$ started to dissolve. After 0.5 hours, all HfCl$_4$ dissolved. The mixture was stirred at 79° C. overnight. Pumped off toluene, and the residue was extracted with dichloromethane (80 mL). Attempt to crystallize the product failed. Solvent was pumped to dryness and 3.0 gram of orange solid was obtained. $^1$H NMR showed it is the desired crude product.

Dimethyl(1,2,3-trimethyl-4-phenyl-4-hydrocyclopent[b]indolyl)(tri(1-adamantyl)phosphiniminate) hafnium

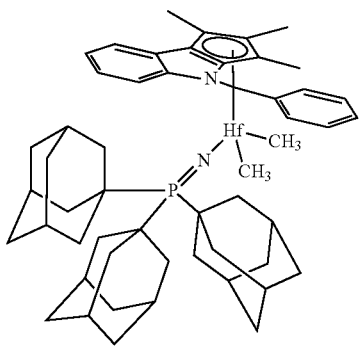

To the orange solid from the last step (2.0 g, 3.58 mmol) in toluene (~40 mL) at −70° C. was added a slurry of (1-Ad)$_3$P=NLi prepared from adding nBuLi (2.28 mL) to (1-Ad)$_3$P=NH (1.62 g, 3.58 mmol) in toluene (30 mL) and overnight stirring. The mixture was stirred and was allowed to warm to room temperature. After being stirred overnight, the solution was filtered to remove LiCl through celite. This forms the [1,2,3-trimethyl-4-phenyl-4-hydrocyclopent[b]indolyl](tri-1-adamantyl)hafnium dichloride. The solution was pumped to dryness and was used for the next step.

MeMgBr (3.0 M, 3.0 mL) in diethyl ether was added to a toluene solution of the solid from the last step. The solution was stirred overnight and was pumped to dryness. The residue was extracted with pentane (~150 mL). The pentane extract was filtered to remove insoluble solids. The pentane filtrate was concentrated to 25 mL and cooled at −35° C.; however, no crystals formed. However, once the solution warmed to room temperature and allowed to stand for about 30 minutes, the product began to crystallize. After 3 hours, the mother liquor was decanted and the white crystalline solid was washed with pentane (3×5 mL) and dried under vacuum (0.63 g). $^1$H NMR (toluene-d$_8$, d, ppm): 7.85-7.78 (m, 1H), 7.51 (d, J=7 Hz, 2H), 7.33-7.28 (m, 1H), 7.19 (t, J=7 Hz, 2H), 7.15-7.06 (m, 2H), 7.06-7.0 (m, 1H), 2.66 (s, 3H), 2.40-2.29 (br.s, 18H), 2.28 (s, 3H), 2.18 (s, 3H), 1.92 (br.s, 9H), 1.79 (−1.55 (m, 18H), −0.120 (s, 3H), −0.229 (s, 3H). $^{31}$P NMR (toluene-d$_8$, d, ppm): 24.78 (s).

An alternate higher yield synthesis of dimethyl(1,2,3-trimethyl-4-phenyl-4-hydrocyclopent[b]indolyl)(tri(1-adamantyl)phosphiniminate) hafnium follows.

Preparation of 1,2,3-trimethyl-4-phenyl-4-hydrocyclopent[b]indolylhafnium trichloride

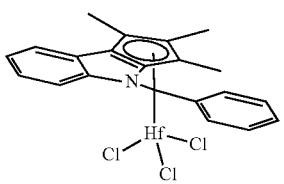

nBuLi (1.6 M, 3.17 mL) was added to a solution of 1,2,3-trimethyl-4-phenyl-1,4-dihydrocyclopent[b]indole (1.389 g, 5.08 mmol) in diethyl ether (60 mL) in a 125 mL hypo vial at room temperature. A very thick slurry formed, which was stirred at room temperature for 1 hour. HfCl$_4$ (1.627 g, 5.08 mmol) was weighed in a 300 mL Kontes flask and toluene (25 mL) was added. The flask was cooled to −70° C. and the content was stirred. Diethyl ether (~100 mL) was added slowly. The very thick slurry from the last reaction was transferred to the Schlenk flask. The vial was rinsed with diethyl ether (3×5 mL) and the washing solution was transferred to the Schlenk flask. The cold bath was removed, and the reaction was allowed to warm to room temperature. No apparent change was observed. The content was stirred for 3 days. A yellow solution formed with suspension of LiCl. Diethyl ether was removed by vacuum pumping leaving a toluene solution of the product with little amount of LiCl. The product was used without further isolation.

Preparation of [1,2,3-trimethyl-4-phenyl-4-hydrocyclopent[b]indolyl](tri(1-adamantyl) phosphiniminate) hafnium dichloride

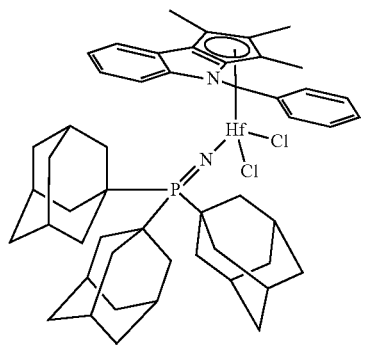

nBuLi (1.6 M, 3.33 mL) was added to (1-Ad)$_3$P=NH (2.294 g, 5.08 mol) in toluene (~40 mL) at room temperature. The mixture was stirred at room temperature for 3 hours to form a slurry of (1-Ad)$_3$P=NLi in toluene. This slurry was transferred to the Cp'HfCl$_3$ solution at −70° C. The stirred slurry was warmed to room temperature. After being stirred overnight, the solid was filtered off and the filtrate was pumped to dryness. $^1$H and $^{31}$P NMR showed that the product (Cp')[(1-Ad)$_3$PN]HfCl$_2$ was pure. $^1$H NMR (CD$_2$Cl$_2$, d, ppm): 7.77 (d, J=7 Hz, 1H), 7.67 (br.d, J=7 Hz, 2H), 7.54 (t, J=8 Hz, 2H), 7.41 (tt, J=7 Hz, J=1.3 Hz, 1H), 7.25 (d, J=7 Hz, 1H), 7.20 (td, J=7 Hz, J=1.3 Hz, 1H), 7.11 (td, J=7 Hz, J=1.3 Hz, 1H), 2.79 (s, 3H), 2.40 (s, 3H), 2.32 (br.s, 16H), 2.11 (s, 3H), 2.02 (br.s, 9H), 1.76 (br.m, 20H). $^{31}$P NMR (CD$_2$Cl$_2$, d, ppm): 30.9 (s).

Preparation dimethyl(1,2,3-trimethyl-4-phenyl-4-hydrocyclopent[b]indolyl)(tri(1-adamantyl) phosphiniminate) hafnium

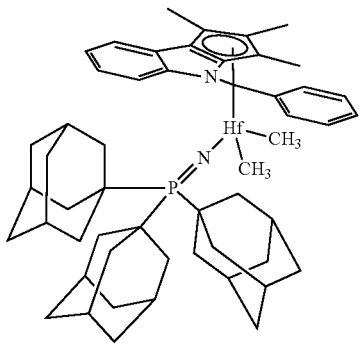

To the solution of the above reaction at room temperature was added $CH_3MgBr$ solution (3.0 M, 3.0 mL) in diethyl ether. The solution was stirred overnight and was pumped to dryness. The solid was extracted with pentane (3×80 mL). The pentane solution was pumped to dryness to give the target product (1.12 g). $^1H$ NMR (toluene-$d_8$, d, ppm): 7.83-7.78 (m, 1H), 7.51 (d, J=7 Hz, 2H), 7.33-7.27 (m, 1H), 7.19 (t, J=7 Hz, 2H), 7.15-7.06 (3, 2H), 7.06-7.0 (m, 1H), 2.66 (s, 3H), 2.40-2.29 (br.s, 18H), 2.28 (s, 3H), 2.18 (s, 3H), 1.92 (br.s, 9H), 1.79 (−1.55 (m, 18H), −0.127 (s, 3H), −0.233 (s, 3H). $^{31}P$ NMR (toluene-$d_8$, d, ppm): 24.84 (s).

1-Pentafluorobenzyl-2,3,4,5-tetramethylcyclopentadiene

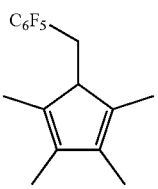

1,2,3,4-Tetramethl-1,3-cyclopentadiene (2 g, 16.37 mmol) was dissolved in the mixture of toluene (25 mL) and THF (25 mL). $KN(TMS)_2$ (3.27 g, 16.39 mmol) was added as a solid at room temperature. The mixture was stirred at room temperature for at least 3 hours, and it was then added into a THF (80 mL) solution of 2,3,4,5,6-pentafluorobenzyl bromide (4.30 g, 16.35 mmol) dropwise at −78° C. The reaction was warmed to room temperature and stirred overnight. All volatiles were removed in vacuo, and the product was extracted with toluene (3×50 mL) and filtered through a pad of Celite. The solvent of the combined filtrate was removed under vacuum, and the product was obtained as a yellow liquid (4.5 g).

1-Pentafluorobenzyl-1-trimethylsilyl-2,3,4,5-tetramethyl-cyclopentadiene

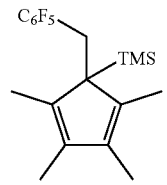

The yellow liquid (4.5 g) from above was dissolved in toluene (80 mL), and a toluene solution of $KN(TMS)_2$ (3 g, 15.04 mmol) was added dropwise at room temperature. The reaction was stirred overnight. The precipitate (4 g) was collected through filtration, washed with pentane (3×5 mL), and dried in vacuo. The dried precipitate was dissolved in THF (60 mL) and chlorotrimethylsilane (3.52 g, 17.64 mmol) was added at room temperature. The reaction was stirred overnight. All volatiles were removed in vacuo, and the product was extracted with toluene (350 mL). After filtration, the solvent of the combined filtrate was removed under reduced pressure to give the product as a yellow liquid (2.5 g).

Tribenzyl(1-pentafluorobenzyl-2,3,4,5-tetramethyl-cyclopentadienide) hafnium

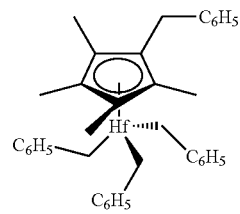

The product obtained from above (2.5 g), $HfCl_4$ (2.14 g, 6.68 mmol) and toluene (50 mL) was mixed and heated at 90° C. overnight. All solids dissolved and a clear purple solution was obtained. After all volatiles were removed in vacuo, the residue was dissolved in toluene (50 mL). Benzylmagnesium chloride (14.6 mL, 14.6 mmol, 1 M in $Et_2O$) was added at room temperature. The reaction was stirred overnight, and all volatiles were removed in vacuo. Toluene (20 mL) was added into the residue. After being stirred for 20 minutes, all volatiles were removed under vacuum again. This process was repeated 3 times. The product was then extracted with toluene (3×50 mL) and filtered through a pad of Celite. After all solvents of the combined filtrate were removed, a yellow oil was obtained. The oil was dissolved in heptane (15 mL). The product was obtained as yellow crystals after the heptane solution was placed at −35° C. for several days. Yield: 4.9 g. $^1H$ NMR (toluene-$d_8$, δ, ppm): 7.30 (t, 6H), 7.07 (d, 3H), 6.80 (d, 6H), 3.55 (s, 2H), 2.05 (s, 6H), 1.95 (s, 6H), 1.86 (s, 6H). $^{19}F$ NMR (toluene-$d_8$, δ, ppm): −140.64 (d, 2F), −156.42 (t, 1F), −161.59 (dt, 2F).

Dibenzyl(1-pentafluorobenzyl-2,3,4,5-tetramethyl-cyclopentadienide)(tri(1-adamantyl)phosphiminate) hafnium

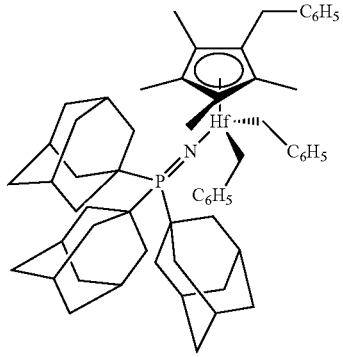

Tribenzyl, (1-pentafluorobenzyl-2,3,4,5-tetramethyl-cyclopentadienide) hafnium (2.3 g, 3.05 mmol) was dissolved in toluene (50 mL). Tri(1-adamantyl)phosphinimine (1.38 g, 3.05 mmol) was added as a solid. The mixture was stirred at room temperature for 3 hours. A clean yellow solution was formed. All volatiles were removed to give the desired product. The analytical pure product was obtained as a white solid from recrystallization in a toluene/heptane solution at −35° C. Yield: 2.7 g, 80%. $^1$H NMR (bromobenzene-d$_5$, δ, ppm): 7.35 (t, 4H), 7.29 (d, 4H), 7.00 (t, 2H), 3.82 (s, 2H), 2.53 (br, 18H), 2.26 (s, 4H), 2.23 (s, 6H), 2.17 (br, 9H), 2.12 (s, 6H), 1.94 (d, 9H), 1.83 (d, 9H). $^{31}$P NMR (bromobenzene-d$_5$, δ, ppm): 28.34 (s). $^{19}$F NMR (bromobenzene-d$_5$, δ, ppm): −140.68 (dd, 2F), −157.74 (t, 1F), −162.24 (dt, 2F).

Preparation of potassium 1,2,3,4,5-pentapropylcyclopentadienide

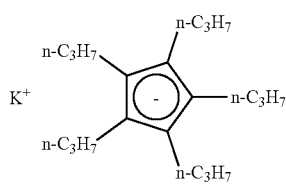

1,2,3,4,5-pentapropylcyclopentadiene (6.2 g, 22.4 mmol), prepared according to the procedure described in *Chemistry—A European Journal* 2002, 8(18), 4292-4298, was dissolved in toluene (20 mL). Potassium hexamethyldisilazide (4.483 g, 22.5 mmol) was dissolved in toluene (40 mL) and added and the mixture stirred overnight, resulting in a precipitate. The solids were collected, rinsed with toluene (2×10 mL), pentane (3×10 mL) and dried under reduced pressure. The product was used as is.

Preparation of trimethyl(1,2,3,4,5-pentapropylcyclopenta-2,4-dien-1-yl)silane

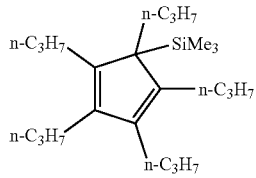

Potassium 1,2,3,4,5-pentapropylcyclopentadienide (0.749 g, 2.38 mmol) was slurried in THF (5 mL) in a vial. On vigorous stirring, chlorotrimethylsilane (0.33 mL, 2.62 mmol) was added. The reaction mixture was stirred overnight, resulting in a thickened creamy yellow suspension. Volatiles were removed, yielding a paste. Extraction with pentane and filtration afforded a yellow filtrate. Evaporation of the filtrate afforded the desired product as a yellow oil (0.602 g, 1.73 mmol, 73% yield). $^1$H NMR (toluene-d$_8$, δ, ppm): 2.50-2.10 (br, 10H, CH$_2$CH$_2$CH$_3$), 1.80-1.40 (br, 10H, CH$_2$CH$_2$CH$_3$), 1.10-0.80 (br, 15H, CH$_2$CH$_2$CH$_3$), 0.00 (s, 9H, SiMe$_3$).

Preparation of (pentapropylcyclopentadienyl)hafnium trichloride

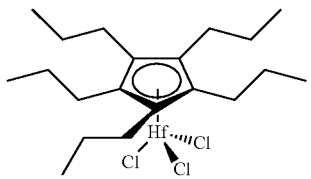

Trimethyl(1,2,3,4,5-pentapropylcyclopenta-2,4-dien-1-yl)silane (1.969 g, 5.647 mmol) was diluted with toluene (50 mL) in a 10-mL round-bottomed flask. Hafnium(IV) chloride (2.713 g, 8.470 mmol) was added, a condenser attached, and the reaction mixture was heated to 95° C. for 3 days. The dark red-brown mixture was filtered, and the filtrate was evaporated to dryness. The crude product was purified by recrystallization from toluene/heptane to afford the desired product as a dark brown solid (2.353 g, 74% yield). $^1$H NMR (toluene-d$_8$, δ, ppm): 2.60 (t, 10H, CH$_2$CH$_2$CH$_3$), 1.40 (sextet, 10H, CH$_2$CH$_2$CH$_3$), 0.87 (t, 15H, CH$_2$CH$_2$CH$_3$).

Preparation of tribenzyl(pentapropylcyclopentadienyl)hafnium

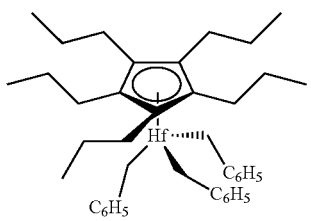

(Pentapropylcyclopentadienyl)hafnium (IV) chloride (1.723 g, 3.075 mmol) was dissolved in toluene (12 mL). On vigorous stirring, benzylmagnesium chloride (12.30 mL of 1.0 M solution in Et$_2$O, 12.30 mmol) was added, resulting in a bright yellow suspension. After stirring for 4 hours, volatiles were evaporated under reduced pressure to afford a sticky gel. Trituration with pentane afforded a solid residue. The residue was extracted with toluene and filtered. The filtrate was evaporated, slurried in heptane, and solids were collected and dried to afford the desired product as bright yellow solids (0.969 g, 43% yield). $^1$H NMR (toluene-d$_8$, δ, ppm): 7.17 (t, 6H, m-ArH), 6.91 (t, 3H, p-ArH), 6.74 (d, 6H, o-ArH), 2.30 (m, 10H, CH$_2$CH$_2$CH$_3$), 1.85 (s, 6H, CH$_2$Ph), 1.55 (sextet, 10H, CH$_2$CH$_2$CH$_3$), 0.98 (t, 15H, CH$_2$CH$_2$CH$_3$).

Preparation of dibenzyl(pentapropylcyclopentadienyl)(tri(1-adamantyl)phosphiniminate) hafnium

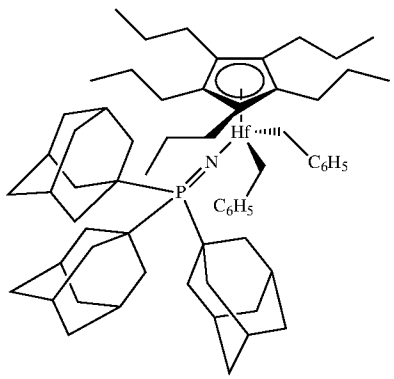

Tribenzyl(pentapropylcyclopentadienyl)hafnium (IV) (1.061 g, 1.459 mmol) and tri(1-adamantyl)phosphinimine (0.659 g, 1.459 mmol) were slurried in toluene (15 mL) and stirred overnight. The mixture was diluted with toluene (50 mL), filtered, and the filtrate was concentrated to saturation at 60° C., cooled to room temperature, and layered with pentane. Recrystallized product was recovered the next day (0.644 g, 41% recrystallized yield). $^1$H NMR (toluene-d$_8$, δ, ppm): 7.30-6.80 (m, 10H, CH$_2$Ph), 2.60-1.50 (m, 54H, CH$_2$CH$_2$CH$_3$ & 1-Ad), 1.06 (t, 15H, CH$_2$CH$_2$CH$_3$).

Preparation of dibenzyl(cyclopentadienyl)(tri(1-adamantyl)phosphiniminate) zirconium

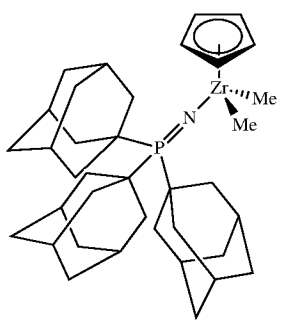

Cyclopentadienylzirconium (IV) trichloride (0.672 g, 2.56 mmol) was slurried in Et$_2$O (40 mL) and cooled to −30° C. Methylmagnesium bromide (2.84 mL of 3.0 M solution in Et$_2$O, 8.52 mmol) was added, affording a creamy yellow suspension. After stirring for 3 hours at −30° C., (1-Ad)$_3$PNH was added. The reaction mixture was warmed to room temperature overnight. Volatiles were removed, the residue extracted with toluene, filtered, and the filtrate was evaporated under reduced pressure. Repeated recrystallizations from chlorobenzene and pentane afforded the desired product as a white solid (0.31 g, 19% recrystallized yield). $^1$H NMR (toluene-d$_8$, δ, ppm): 6.38 (s, 5H, C$_5$H$_5$), 2.41 (br, 18H, 1-Ad), 1.96 (br, 9H, 1-Ad), 1.90-1.50 (m, 18H, 1-Ad), 0.33 (s, 6H, ZrMe$_2$). $^{31}$P{$^1$H}NMR (toluene-d$_8$, δ, ppm): 18.5 (s).

Continuous Solution Polymerization

Continuous polymerizations were conducted on a continuous polymerization unit (CPU) using cyclohexane as the solvent. The CPU contained a 71.5 mL stirred reactor and was operated between 130 to 190° C. for the polymerization experiments. An upstream mixing reactor having a 20 mL volume was operated at 5° C. lower than the polymerization reactor. The mixing reactor was used to pre-heat the ethylene, octene and some of the solvent streams. Catalyst feeds (xylene or cyclohexane solutions of the pre-catalyst complex ((e.g., Cp*(1-Ad$_3$PN)HfCl$_2$)) and (Ph$_3$C)[B(C$_6$F$_5$)$_4$] as a catalyst activator and additional solvent were added directly to the polymerization reactor in a continuous process. Additional feeds of MMAO-7 with and without 2,6-di-tert-butyl-4-ethylphenol (BHEB) and solvent were also added to the polymerization reactor in a continuous process. Note that MAO refers to MMAO-7; MMAO-7 is a commercially available methylaluminoxane that is reported to contain some higher alkyl substituents (C$_4$-C$_6$) in addition to methyl substituents. A total continuous flow of 27 mL/min into the polymerization reactor was maintained.

Copolymers were made at 1-octene/ethylene weight ratios ranging from 0.15 to 0.5. The ethylene was fed at a 10 wt % ethylene concentration in the polymerization reactor. The CPU system operated at a pressure of 10.5 MPa. The solvent, monomer, and comonomer streams were all purified by the CPU systems before entering the reactor. The polymerization activity, k$_p$ (expressed in mM$^{-1}$·min$^{-1}$), is defined as:

$$k_p = \left(\frac{Q}{100-Q}\right)\left(\frac{1}{[M]}\right)\left(\frac{1}{HUT}\right)$$

where Q is ethylene conversion (%) (measured using an online gas chromatograph (GC)), [M] is catalyst concentration in the reactor (mM), and HUT is hold-up time in the reactor (2.6 min).

Copolymer samples were collected at 90±1% ethylene conversion (Q), dried in a vacuum oven, ground, and then analyzed using FTIR (for short-chain branch frequency) and GPC-RI (for molecular weight and distribution). Polymerization results are summarized in Tables 1-3 below.

Polymerization Results

The results shown in Table 1 are all comparative (Comparative Examples 1 through 7) because the phosphinimine ligand of the catalyst used in these experiments does not have an adamantyl moiety.

TABLE 1

Impact of Scavenger on Cp*(tBu$_3$PN)Hf(CH$_2$Ph)$_2$ Catalyst[1]

| Examples (Comparative) | Temp. (°C.) | Scavenger | Al/Hf (mol/mol) | BHEB/Al (mol/mol) | Activity k$_p$ | Ethylene Conversion % |
|---|---|---|---|---|---|---|
| Comp. 1 | 160 | MAO/BHEB | 39.75 | 0.30 | 5936 | 89.14 |
| Comp. 2 | 160 | MAO/BHEB | 37.50 | 0.30 | 6106 | 89.41 |
| Comp. 3 | 160 | MAO only | 18.00 | — | 3280 | 90.43 |
| Comp. 4 | 140 | TIBAL | 9.00 | — | 1327 | 88.43 |
| Comp. 5 | 160 | TEAL | 37.5 | — | 45 | 5.81 |
| Comp. 6 | 190 | TEAL | 4.78 | — | 7 | 7.3 |
| Comp. 7 | 190 | TEAL | 14.34 | — | 10 | 9.9 |

Note 1:
The 1-Octene/ethylene ratio was 0.3 wt/wt for Examples 1-5; no 1-octene was added to the reactor for Examples 6-7. The (Ph$_3$C)[B(C$_6$F$_5$)$_4$]/Hf molar ratio was 1.2 for Examples 1-5 and 2.0 for Examples 6-7; TIBAL = triisopropyl aluminum; TEAL = triethyl aluminum; BHEB = 2,6-di-tert-butyl-4-ethylphenol; Cp* = pentamethylcyclopentadienyl.

Comparative Examples 1 and 2 show that the catalyst Cp*(tBu$_3$PN)Hf(CH$_2$Ph)$_2$ had moderate activity (k$_p$ of 5936 and 6106 respectively) at 160° C. when MAO/BHEB was used a scavenger. When BHEB was removed while using MAO as the scavenger, as was done in Comp. Example 3, the activity drastically dropped to a k$_p$ of 3280. When simple aluminum alkyls (TIBAL, TEAL) were used as scavengers (Comp. Examples 4-7), the catalyst had low activity or almost no activity at both 160° C. and 190° C.

TABLE 2

Polymerization Results with Cp*(1-Ad$_3$PN)HfMe$_2$ Catalyst[2]

| Example (Inventive) | Temp. (°C.) | Scavenger | 1-C8/C2 (wt/wt) | Al/Hf (mol/mol) | BHEB/Hf (mol/mol) | BHEB/Al (mol/mol) | Activity k$_p$ | Ethylene Conversion % |
|---|---|---|---|---|---|---|---|---|
| 1 | 190 | MAO | 0.15 | 80 | 8 | 0.1 | 10158 | 89.8 |
| 2 | 190 | MAO | 0.5 | 80 | 8 | 0.1 | 9973 | 89.63 |
| 3 | 160 | MAO | 0.5 | 80 | 8 | 0.1 | 21520 | 89.91 |

Note 2:
The (Ph$_3$C)[B(C$_6$F$_5$)$_4$]/Hf ratio was 1.2; 1-octene ("1-C8")/ethylene ("C2") ratio; BHEB = 2,6-di-tert-butyl-4-ethylphenol; 1-Ad = 1-Adamantyl; Cp* = pentamethylcyclopentadienyl.

TABLE 3

Polymerization Results with Cp*(1-Ad$_3$PN)Hf(CH$_2$Ph)$_2$ Catalyst[3]

| Example (Inventive) | Temp (°C.) | Scavenger | (Ph$_3$C)[B(C$_6$F$_5$)$_4$]/Hf (mol/mol) | 1-C8/C2 (wt/wt) | Al/Hf (mol/mol) | BHEB/Hf (mol/mol) |
|---|---|---|---|---|---|---|
| 4 | 160 | MAO | 1.20 | 0.5 | 80 | 24 |
| 5 | 160 | MAO | 1.20 | 0.5 | 80 | 0 |
| 6 | 160 | MAO | 1.20 | 0.5 | 4.98 | 0 |
| 7 | 190 | MAO | 1.20 | 0.5 | 5.01 | 0 |
| 8 | 160 | TnOAl | 1.12 | 0.5 | 4.73 | 0 |
| 9 | 160 | Et$_2$AlOEt | 1.12 | 0.5 | 3.54 | 0 |

| Example (Inventive) | BHEB/Al (mol/mol) | Activity (k$_p$) | Ethylene Conversion (%) | SCB/1000C | Mw | PD (Mw/Mn) |
|---|---|---|---|---|---|---|
| 4 | 0.3 | 20,950 | 90.32 | 12.0 | 31,082 | 1.91 |
| 5 | 0.0 | 16,736 | 90.26 | 13.3 | 29,509 | 1.90 |
| 6 | 0.0 | 18,462 | 90.11 | 12.6 | 30,758 | 1.84 |
| 7 | 0.0 | 12,932 | 92.11 | 12.6 | 19,180 | 1.93 |
| 8 | 0.0 | 11,560 | 89.95 | 11.6 | 32,499 | 1.91 |
| 9 | 0.0 | 8,136 | 89.36 | 10.8 | 33,941 | 1.77 |

Note 3:
1-octene = 1-C8; ethylene = C2; BHEB = 2,6-di-tert-butyl-4-ethylphenol; TnOAl = tri(n-octyl)aluminum; 1-Ad = 1-Adamantyl; Cp* = pentamethylcyclopentadienyl.

Table 2 shows that at 160° C., the Cp*(1-Ad$_3$PN)HfMe$_2$ catalyst achieved extremely high activity with a k$_p$ of 21520 (Inv. Example 3) with MAO as scavenger with 0.1 equivalent of BHEB. When polymerization temperature was increased to 190° C. (Inv. Examples 1 and 2), the catalyst activity was still very high with a k$_p$ of 10158 and 9973, respectively.

Table 3 shows the polymerization results with Cp*(1-Ad$_3$PN)Hf(CH$_2$Ph)$_2$ catalyst which has different activatable ligands in comparison to Cp*(1-Ad$_3$PN)HfMe$_2$. At 160° C., in the presence of scavenger (MAO/BHEB), the catalyst system achieved extremely high activity with a k$_p$ of 20950 (Inv. Example 4). At the same temperature (Inv. Example 5), while using only MAO as scavenger (i.e., without the use of bulky phenol BHEB), the catalyst system still achieved very high activity with a k$_p$ of 16763. When the Al/Hf ratio was decreased from 80 to 4.98 (Inv. Example 6), very high activity was still achieved, with a k$_p$ of 18462. Even at 190° 0 (Inv. Example 7), the catalyst activity was still very high with a k$_p$ of 12932. Finally, when the polymerization was carried out using simple aluminum alkyls as a scavenger, such as TnOAl and Et$_2$AlOEt, and in the absence of BHEB, the catalyst activity was still very high with k$_p$'s of greater than 8000 (Inv. Examples 8 and 9).

Further polymerization results employing further catalyst complex derivatives having a cylcopentadientyl type ligand and a phosphinimine ligand bearing an adamantyl moiety (including substituted adamantyl moieties and unsubstituted adamantyl moieties) are reported in Tables 4 and 5. Further complexes based on hafnium and their polymerization results are provided in Table 4, while complexes based on zirconium and their polymerization results are provided in Table 5. The polymers were made using a continuous solution polymerization process in a CPU unit as already described above.

TABLE 4

Polymerization Results with Other Hafnium 1-Adamantyl Phosphinimine Catalysts[4]

| Example, Complex (Inventive) | Temp. (° C.) | Activator | Al/Hf (mol/mol) | BHEB/Al (mol/mol) | C8/C2 (wt/wt) |
|---|---|---|---|---|---|
| 10, Cp*((1-Ad')$_2$(1-Ad)PN)HfBn$_2$ | 140 | [Ph$_3$C][B(C$_6$F$_5$)$_4$] | 45 | 0.3 | 0.15 |
| 11, Cp*((1-Ad')$_2$(1-Ad)PN)HfBn$_2$ | 140 | [Ph$_3$C][B(C$_6$F$_5$)$_4$] | 43 | 0.3 | 0.30 |
| 12, Cp*((1-Ad')$_2$(1-Ad)PN)HfBn$_2$ | 140 | [Ph$_3$C][B(C$_6$F$_5$)$_4$] | 43 | 0.3 | 0.50 |
| 13, Cp*((1-Ad')$_2$(1-Ad)PN)HfBn$_2$ | 140 | [Ph$_3$C][B(C$_6$F$_5$)$_4$] | 45 | 0 | 0.50 |
| 14, Cp*((1-Ad')$_2$(1-Ad)PN)HfBn$_2$ | 190 | [Ph$_3$C][B(C$_6$F$_5$)$_4$] | 25 | 0.3 | 0 |
| 15, Cp*((1-Ad')$_2$(1-Ad)PN)HfBn$_2$ | 190 | [Ph$_3$C][B(C$_6$F$_5$)$_4$] | 28 | 0.3 | 0.15 |
| 16, Cp*((1-Ad')$_2$(1-Ad)PN)HfBn$_2$ | 190 | [Ph$_3$C][B(C$_6$F$_5$)$_4$] | 28 | 0.3 | 0.30 |
| 17, Cp*((1-Ad')$_2$(1-Ad)PN)HfBn$_2$ | 190 | [Ph$_3$C][B(C$_6$F$_5$)$_4$] | 25 | 0.3 | 0.50 |
| 18, (3,5-tBu$_2$—Ph—Me$_4$Cp)((1-Ad)$_3$PN)HfMe$_2$ | 140 | [Ph$_3$C][B(C$_6$F$_5$)$_4$] | 62 | 0.3 | 0.15 |
| 19, (3,5-tBu$_2$—Ph—Me$_4$Cp)((1-Ad)$_3$PN)HfMe$_2$ | 140 | [Ph$_3$C][B(C$_6$F$_5$)$_4$] | 62 | 0.3 | 0.30 |
| 20, (3,5-tBu$_2$—Ph—Me$_4$Cp)((1-Ad)$_3$PN)HfMe$_2$ | 140 | [Ph$_3$C][B(C$_6$F$_5$)$_4$] | 54 | 0.3 | 0.50 |
| 21, (3,5-tBu$_2$—Ph—Me$_4$Cp)((1-Ad)$_3$PN)HfMe$_2$ | 140 | [Ph$_3$C][B(C$_6$F$_5$)$_4$] | 48 | 0 | 0.50 |
| 22, (3,5-Bu$_2$—Ph—Me$_4$Cp)((1-Ad)$_3$PN)HfMe$_2$ | 190 | [Ph$_3$C][B(C$_6$F$_5$)$_4$] | 43 | 0.3 | 0 |
| 23, (3,5-[Bu$_2$—Ph—Me$_4$Cp)((1-Ad)$_3$PN)HfMe$_2$ | 190 | [Ph$_3$C][B(C$_6$F$_5$)$_4$] | 43 | 0.3 | 0.15 |
| 24, (3,5-tBu$_2$—Ph—Me$_4$Cp)((1-Ad)$_3$PN)HfMe$_2$ | 190 | [Ph$_3$C][B(C$_6$F$_5$)$_4$] | 43 | 0.3 | 0.30 |
| 25, (3,5-tBu$_2$—Ph—Me$_4$Cp)((1-Ad)$_3$PN)HfMe$_2$ | 190 | [Ph$_3$C][B(C$_6$F$_5$)$_4$] | 54 | 0.3 | 0.50 |
| 26, [(C$_6$F$_5$CH$_2$)(CH$_3$)$_4$Cp]((1-Ad)$_3$P=N)HfBn$_2$ | 140 | [Ph$_3$C][B(C$_6$F$_5$)$_4$] | 48 | 0.3 | 0.00 |
| 27, [(C$_6$F$_5$CH$_2$)(CH$_3$)$_4$Cp]((1-Ad)$_3$P=N)HfBn$_2$ | 140 | [Ph$_3$C][B(C$_6$F$_5$)$_4$] | 48 | 0.3 | 0.15 |
| 28, [(C$_6$F$_5$CH$_2$)(CH$_3$)$_4$Cp]((1-Ad)$_3$P=N)HfBn$_2$ | 140 | [Ph$_3$C][B(C$_6$F$_5$)$_4$] | 43 | 0.3 | 0.30 |
| 29, [(C$_6$F$_5$CH$_2$)(CH$_3$)$_4$Cp]((1-Ad)$_3$P=N)HfBn$_2$ | 140 | [Ph$_3$C][B(C$_6$F$_5$)$_4$] | 43 | 0.3 | 0.50 |
| 30, [(C$_6$F$_5$CH$_2$)(CH$_3$)$_4$Cp]((1-Ad)$_3$P=N)HfBn$_2$ | 140 | [Ph$_3$C][B(C$_6$F$_5$)$_4$] | 54 | 0 | 0.50 |
| 31, [(C$_6$F$_5$CH$_2$)(CH$_3$)$_4$Cp]((1-Ad)$_3$P=N)HfBn$_2$ | 140 | B(C$_6$F$_5$)$_3$ | 0.96 | 0.3 | 0.30 |
| 32, [(C$_6$F$_5$CH$_2$)(CH$_3$)$_4$Cp]((1-Ad)$_3$P=N)HfBn$_2$ | 190 | [Ph$_3$C][B(C$_6$F$_5$)$_4$] | 19.29 | 0.3 | 0.00 |
| 33, [(C$_6$F$_5$CH$_2$)(CH$_3$)$_4$Cp]((1-Ad)$_3$P=N)HfBn$_2$ | 190 | [Ph$_3$C][B(C$_6$F$_5$)$_4$] | 20.77 | 0.3 | 0.15 |
| 34, [(C$_6$F$_5$CH$_2$)(CH$_3$)$_4$Cp]((1-Ad)$_3$P=N)HfBn$_2$ | 190 | [Ph$_3$C][B(C$_6$F$_5$)$_4$] | 22.50 | 0.3 | 0.30 |
| 35, [(C$_6$F$_5$CH$_2$)(CH$_3$)$_4$Cp]((1-Ad)$_3$P=N)HfBn$_2$ | 190 | [Ph$_3$C][B(C$_6$F$_5$)$_4$] | 20.77 | 0.3 | 0.50 |
| 36, n-Pr$_5$Cp((1-Ad)$_3$PN)HfBn$_2$ | 140 | [Ph$_3$C][B(C$_6$F$_5$)$_4$] | 13.50 | 0.3 | 0.00 |
| 37, n-Pr$_5$Cp((1-Ad)$_3$PN)HfBn$_2$ | 140 | [Ph$_3$C][B(C$_6$F$_5$)$_4$] | 13.50 | 0.3 | 0.15 |
| 38, n-Pr$_5$Cp((1-Ad)$_3$PN)HfBn$_2$ | 140 | [Ph$_3$C][B(C$_6$F$_5$)$_4$] | 13.50 | 0.3 | 0.30 |
| 39, n-Pr$_5$Cp((1-Ad)$_3$PN)HfBn$_2$ | 140 | [Ph$_3$C][B(C$_6$F$_5$)$_4$] | 13.50 | 0.3 | 0.50 |
| 40, n-Pr$_5$Cp((1-Ad)$_3$PN)HfBn$_2$ | 140 | [Ph$_3$C][B(C$_6$F$_5$)$_4$] | 14.59 | 0 | 0.50 |
| 41, n-Pr$_5$Cp((1-Ad)$_3$PN)HfBn$_2$ | 140 | B(C$_6$F$_5$)$_3$ | 0.89 | 0.3 | 0.30 |
| 42, n-Pr$_5$Cp((1-Ad)$_3$PN)HfBn$_2$ | 190 | [Ph$_3$C][B(C$_6$F$_5$)$_4$] | 2 | 0.3 | 0.00 |
| 43, n-Pr$_5$Cp((1-Ad)$_3$PN)HfBn$_2$ | 190 | [Ph$_3$C][B(C$_6$F$_5$)$_4$] | 2 | 0.3 | 0.15 |
| 44, n-Pr$_5$Cp((1-Ad)$_3$PN)HfBn$_2$ | 190 | [Ph$_3$C][B(C$_6$F$_5$)$_4$] | 2 | 0.3 | 0.30 |
| 45, n-Pr$_5$Cp((1-Ad)$_3$PN)HfBn$_2$ | 190 | [Ph$_3$C][B(C$_6$F$_5$)$_4$] | 2 | 0.3 | 0.50 |
| 46, [(Ph-Indolyl)(1,2,3-Me$_3$Cp)]((1-Ad)$_3$P=N)HfMe$_2$ | 140 | [Ph$_3$C][B(C$_6$F$_5$)$_4$] | 48 | 0.3 | 0.00 |
| 47, [(Ph-Indolyl)(1,2,3-Me$_3$Cp)]((1-Ad)$_3$P=N)HfMe$_2$ | 140 | [Ph$_3$C][B(C$_6$F$_5$)$_4$] | 43.20 | 0.3 | 0.15 |
| 48, [(Ph-Indolyl)(1,2,3-Me$_3$Cp)]((1-Ad)$_3$P=N)HfMe$_2$ | 140 | [Ph$_3$C][B(C$_6$F$_5$)$_4$] | 43.20 | 0.3 | 0.30 |
| 49, [(Ph-Indolyl)(1,2,3-Me$_3$Cp)]((1-Ad)$_3$P=N)HfMe$_2$ | 140 | [Ph$_3$C][B(C$_6$F$_5$)$_4$] | 36 | 0.3 | 0.50 |
| 50, [(Ph-Indolyl)(1,2,3-MesCp)]((1-Ad)$_3$P=N)HfMe$_2$ | 140 | [Ph$_3$C][B(C$_6$F$_5$)$_4$] | 36 | 0 | 0.50 |
| 51, [(Ph-Indolyl)(1,2,3-Me$_3$Cp)]((1-Ad)$_3$P=N)HfMe$_2$ | 140 | B(C$_6$F$_5$)$_3$ | 3.38 | 0.3 | 0.30 |
| 52, [(Ph-Indolyl)(1,2,3-Me$_3$Cp)]((1-Ad)$_3$P=N)HfMe$_2$ | 190 | [Ph$_3$C][B(C$_6$F$_5$)$_4$] | 15.43 | 0.3 | 0.00 |

TABLE 4-continued

Polymerization Results with Other Hafnium 1-Adamantyl Phosphinimine Catalysts[4]

| Example, Complex (Inventive) | Temp. (° C.) | Activator | Al/Hf (mol/mol) | BHEB/Al (mol/mol) | C8/C2 (wt/wt) |
|---|---|---|---|---|---|
| 53, [(Ph-Indolyl)(1,2,3-Me$_3$Cp)]((1-Ad)$_3$P=N)HfMe$_2$ | 190 | [Ph$_3$C][B(C$_6$F$_5$)$_4$] | 15.43 | 0.3 | 0.15 |
| 54, [(Ph-Indolyl)(1,2,3-Me$_3$Cp)]((1-Ad)$_3$P=N)HfMe$_2$ | 190 | [Ph$_3$C][B(C$_6$F$_5$)$_4$] | 15.43 | 0.3 | 0.30 |
| 55, [(Ph-Indolyl)(1,2,3-Me$_3$Cp)]((1-Ad)$_3$P=N)HfMe$_2$ | 190 | [Ph$_3$C][B(C$_6$F$_5$)$_4$] | 15.43 | 0.3 | 0.50 |
| 56, [(Ph-Indolyl)(1,2,3-Me$_3$Cp)]((1-Ad)$_3$P=N)HfMe$_2$ | 190 | [Ph$_3$C][B(C$_6$F$_5$)$_4$] | 15.43 | 0 | 0.5 |

| Example, Complex (Inventive) | Ethylene Conversion (%) | Activity (k$_p$) | SCB/1000C | Mw | PD Mw/Mn |
|---|---|---|---|---|---|
| 10, Cp*((1-Ad')$_2$(1-Ad)PN)HfBn$_2$ | 90.14 | 7,995 | | | |
| 11, Cp*((1-Ad')$_2$(1-Ad)PN)HfBn$_2$ | 90.44 | 7,859 | | | |
| 12, Cp*((1-Ad')$_2$(1-Ad)PN)HfBn$_2$ | 89.34 | 6,963 | 12.3 | 41,573 | 2.02 |
| 13, Cp*((1-Ad')$_2$(1-Ad)PN)HfBn$_2$ | 90.49 | 8,321 | | | |
| 14, Cp*((1-Ad')$_2$(1-Ad)PN)HfBn$_2$ | 90.53 | 4,672 | 0.6 | 27,144 | 1.98 |
| 15, Cp*((1-Ad')$_2$(1-Ad)PN)HfBn$_2$ | 89.31 | 4,507 | 3.2 | 25,998 | 2.24 |
| 16, Cp*((1-Ad')$_2$(1-Ad)PN)HfBn$_2$ | 89.67 | 4,683 | 6 | 24,731 | 2.04 |
| 17, Cp*((1-Ad')$_2$(1-Ad)PN)HfBn$_2$ | 90.20 | 4,498 | 9.5 | 23,142 | 2.12 |
| 18, (3,5-[Bu$_2$—Ph—Me$_4$Cp)((1-Ad)$_3$PN)HfMe$_2$ | 90.60 | 11,439 | | | |
| 19, (3,5-tBu$_2$—Ph—Me$_4$Cp)((1-Ad)$_3$PN)HfMe$_2$ | 89.3 | 9,905 | | | |
| 20, (3,5-tBu$_2$—Ph—Me$_4$Cp)((1-Ad)$_3$PN)HfMe$_2$ | 90.2 | 9,558 | 16.4 | 50,712 | 1.82 |
| 21, (3,5-[Bu$_2$—Ph—Me$_4$Cp)((1-Ad)$_3$PN)HfMe$_2$ | 89.75 | 8,083 | | | |
| 22, (3,5-[Bu$_2$—Ph—Me$_4$Cp)((1-Ad)$_3$PN)HfMe$_2$ | 89.08 | 6,777 | 1.3 | 32,740 | 2.07 |
| 23, (3,5-[Bu$_2$—Ph—Me$_4$Cp)((1-Ad)$_3$PN)HfMe$_2$ | 89.63 | 7,181 | 4.2 | 28,528 | 1.89 |
| 24, (3,5-[Bu$_2$—Ph—Me$_4$Cp)((1-Ad)$_3$PN)HfMe$_2$ | 90.03 | 7,502 | 7.9 | 26,289 | 1.9 |
| 25, (3,5-tBu$_2$—Ph—Me$_4$Cp)((1-Ad)$_3$PN)HfMe$_2$ | 90.92 | 10,398 | 11.6 | 22,719 | 1.9 |
| 26, [(C$_6$F$_5$CH$_2$)(CH$_3$)$_4$Cp]((1-Ad)$_3$P=N)HfBn$_2$ | 89.79 | 8,118 | <0.5 | 49,053 | 1.84 |
| 27, [(C$_6$F$_5$CH$_2$)(CH$_3$)$_4$Cp]((1-Ad)$_3$P=N)HfBn$_2$ | 89.02 | 7,484 | 4.2 | 44,126 | 1.72 |
| 28, [(C$_6$F$_5$CH$_2$)(CH$_3$)$_4$Cp]((1-Ad)$_3$P=N)HfBn$_2$ | 90.7 | 8,102 | 8.9 | 37,739 | 1.89 |
| 29, [(C$_6$F$_5$CH$_2$)(CH$_3$)$_4$Cp]((1-Ad)$_3$P=N)HfBn$_2$ | 90.37 | 7,796 | 13.7 | 34,292 | 1.93 |
| 30, [(C$_6$F$_5$CH$_2$)(CH$_3$)$_4$Cp]((1-Ad)$_3$P=N)HfBn$_2$ | 89.21 | 8,586 | 13.2 | 35,813 | 1.89 |
| 31, [(C$_6$F$_5$CH$_2$)(CH$_3$)$_4$Cp]((1-Ad)$_3$P=N)HfBn$_2$ | 89.4 | 156 | 5.9 | 36,873 | 2.12 |
| 32, [(C$_6$F$_5$CH$_2$)(CH$_3$)$_4$Cp]((1-Ad)$_3$P=N)HfBn$_2$ | 90.27 | 3,441 | 1.8 | 12,510 | 2.43 |
| 33, [(C$_6$F$_5$CH$_2$)(CH$_3$)$_4$Cp]((1-Ad)$_3$P=N)HfBn$_2$ | 90.31 | 3,722 | 4.9 | 13,376 | 2.17 |
| 34, [C$_6$F$_5$CH$_2$)(CH$_3$)$_4$Cp]((1-Ad)$_3$P=N)HfBn$_2$ | 89.63 | 3,740 | 7.1 | 13,604 | 2.03 |
| 35, [(C$_6$F$_5$CH$_2$)(CH$_3$)$_4$Cp]((1-Ad)$_3$P=N)HfBn$_2$ | 90.55 | 3,827 | 12.1 | 11,781 | 3.43 |
| 36, n-Pr$_5$Cp((1-Ad)$_3$PN)HfBn$_2$ | 89.40 | 2,190 | <0.5 | 58,756 | 1.74 |
| 37, n-Pr$_5$Cp((1-Ad)$_3$PN)HfBn$_2$ | 89.76 | 2,276 | 4.7 | 53,406 | 1.77 |
| 38, n-Pr$_5$Cp((1-Ad)$_3$PN)HfBn$_2$ | 90.45 | 2,459 | 9.7 | 50,981 | 2.37 |
| 39, n-Pr$_5$Cp((1-Ad)$_3$PN)HfBn$_2$ | 90.94 | 2,606 | 15.1 | 48,566 | 1.7 |
| 40, n-Pr$_5$Cp((1-Ad)$_3$PN)HfBn$_2$ | 90.38 | 2,637 | 15.6 | 49,385 | 1.85 |
| 41, n-Pr$_5$Cp((1-Ad)$_3$PN)HfBn$_2$ | 89.33 | 143 | 8.2 | 66,457 | 1.72 |
| 42, n-Pr$_5$Cp((1-Ad)$_3$PN)HfBn$_2$ | 89.28 | 333 | 0.8 | 29,275 | 2.00 |
| 43, n-Pr$_5$Cp((1-Ad)$_3$PN)HfBn$_2$ | 89.4 | 337 | 4.1 | 27,045 | 1.89 |
| 44, n-Pr$_5$Cp((1-Ad)$_3$PN)HfBn$_2$ | 89.48 | 340 | 6.5 | 24,177 | 2.39 |
| 45, n-Pr$_5$Cp((1-Ad)$_3$PN)HfBn$_2$ | 89.53 | 342 | 10.4 | 24,495 | 1.97 |
| 46, [(Ph-Indolyl)(1,2,3-Me$_3$Cp)]((1-Ad)$_3$P=N)HfMe$_2$ | 90.08 | 8,382 | 1.5 | 35,141 | 2.03 |
| 47, [(Ph-Indolyl)(1,2,3-Me$_3$Cp)]((1-Ad)$_3$P=N)HfMe$_2$ | 90.15 | 7,603 | 8.5 | 29,802 | 2.16 |
| 48, [(Ph-Indolyl)(1,2,3-Me$_3$Cp)]((1-Ad)$_3$P=N)HfMe$_2$ | 89.41 | 7,014 | 13.2 | 26,483 | 2.07 |
| 49, [(Ph-Indolyl)(1,2,3-Me$_3$Cp)]((1-Ad)$_3$P=N)HfMe$_2$ | 90.25 | 6,408 | 20.4 | 23,516 | 2.17 |

TABLE 4-continued

Polymerization Results with Other Hafnium 1-Adamantyl Phosphinimine Catalysts[4]

| Example, Complex (Inventive) | Temp. (° C.) | Activator | Al/Hf (mol/mol) | BHEB/Al (mol/mol) | C8/C2 (wt/wt) |
|---|---|---|---|---|---|
| 50, [(Ph-Indolyl)(1,2,3-Me$_3$Cp)]((1-Ad)$_3$P=N)HfMe$_2$ | 90.32 | | 6,460 | 21.6 | 20,524 | 2.47 |
| 51, [(Ph-Indolyl)(1,2,3-Me$_3$Cp)]((1-Ad)$_3$P=N)HfMe$_2$ | 90.1 | | 591 | 13.3 | 31,165 | 2.02 |
| 52, [(Ph-Indolyl)(1,2,3-Me$_3$Cp)]((1-Ad)$_3$P=N)HfMe$_2$ | 90.75 | | 2,911 | | | |
| 53, [(Ph-Indolyl)(1,2,3-Me$_3$Cp)]((1-Ad)$_3$P=N)HfMe$_2$ | 90.50 | | 2,826 | | | |
| 54, [(Ph-Indolyl)(1,2,3-Me$_3$Cp)]((1-Ad)$_3$P=N)HfMe$_2$ | 90.48 | | 2,820 | | | |
| 55, [(Ph-Indolyl)(1,2,3-Me$_3$Cp)]((1-Ad)$_3$P=N)HfMe$_2$ | 90.50 | | 2,826 | | | |
| 56, [(Ph-Indolyl)(1,2,3-Me$_3$Cp)]((1-Ad)$_3$P=N)HfMe$_2$ | 89.73 | | 2,592 | | | |

Note[4]:
Scavenger = MAO; Al concentration in the reactor was 20 umol/L; [Ph$_3$C][B(C$_6$F$_5$)$_4$]/Hf molar ratio = 1.2; B(C$_6$F$_5$)$_3$/Hf molar ratio = 1.2; BHEB = 2,6-di-tert-butyl-4-ethylphenol; (Ph-Indolyl)(1,2,3-Me$_3$Cp = 1,2,3-trimethyl-4-phenyl-4-hydrocyclopent[b]indolyl; 1-Ad = 1-Adamantyl; 1-Ad' = 3,5-Me$_2$-1-Ad, Cp* = pentamethylcyclopentadienyl.

TABLE 5

Polymerization Results with Zirconium 1-Adamantyl Phosphinimine Catalysts[5]

| Example, Complex (Inventive) | Temp. (° C.) | Activator | Al/Zr (mol/mol) | BHEB/Al (mol/mol) | C8/C2 (wt/wt) |
|---|---|---|---|---|---|
| 57, Cp*((1-Ad')$_2$(1-Ad)PN)Zr(CH$_2$Ph)$_2$ | 140 | [Ph$_3$C][B(C$_6$F$_5$)$_4$] | 66 | 0.3 | 0.15 |
| 58, Cp*((1-Ad')$_2$(1-Ad)PN)Zr(CH$_2$Ph)$_2$ | 140 | [Ph$_3$C][B(C$_6$F$_5$)$_4$] | 64 | 0.3 | 0.30 |
| 59, Cp*((1-Ad')$_2$(1-Ad)PN)Zr(CH$_2$Ph)$_2$ | 140 | [Ph$_3$C][B(C$_6$F$_5$)$_4$] | 64 | 0.3 | 0.50 |
| 60, Cp*((1-Ad')$_2$(1-Ad)PN)Zr(CH$_2$Ph)$_2$ | 140 | B(C$_6$F$_5$)$_3$ | 13.5 | 0.3 | 0.30 |
| 61, Cp*((1-Ad')$_2$(1-Ad)PN)Zr(CH$_2$Ph)$_2$ | 190 | [Ph$_3$C][B(C$_6$F$_5$)$_4$] | 36 | 0.3 | 0 |
| 62, Cp*((1-Ad')$_2$(1-Ad)PN)Zr(CH$_2$Ph)$_2$ | 190 | [Ph$_3$C][B(C$_6$F$_5$)$_4$] | 36 | 0.3 | 0.15 |
| 63, Cp*((1-Ad')$_2$(1-Ad)PN)Zr(CH$_2$Ph)$_2$ | 190 | [Ph$_3$C][B(C$_6$F$_5$)$_4$] | 36 | 0.3 | 0.30 |
| 64, Cp*((1-Ad')$_2$(1-Ad)PN)Zr(CH$_2$Ph)$_2$ | 190 | [Ph$_3$C][B(C$_6$F$_5$)$_4$] | 54 | 0.3 | 0.50 |
| 65, Cp*((1-Ad)$_3$PN)Zr(CH$_2$Ph)$_2$ | 140 | [Ph$_3$C][B(C$_6$F$_5$)$_4$] | 98 | 0.3 | 0.15 |
| 66, Cp*((1-Ad)$_3$PN)Zr(CH$_2$Ph)$_2$ | 140 | [Ph$_3$C][B(C$_6$F$_5$)$_4$] | 83 | 0.3 | 0.30 |
| 67, Cp*((1-Ad)$_3$PN)Zr(CH$_2$Ph)$_2$ | 140 | [Ph$_3$C][B(C$_6$F$_5$)$_4$] | 65 | 0.3 | 0.50 |
| 68, Cp*((1-Ad)$_3$PN)Zr(CH$_2$Ph)$_2$ | 140 | B(C$_6$F$_5$)$_3$ | 48 | 0.3 | 0.30 |
| 69, Cp*((1-Ad)$_3$PN)Zr(CH$_2$Ph)$_2$ | 190 | [Ph$_3$C][B(C$_6$F$_5$)$_4$] | 47 | 0.3 | 0 |
| 70, Cp*((1-Ad)$_3$PN)Zr(CH$_2$Ph)$_2$ | 190 | [Ph$_3$C][B(C$_6$F$_5$)$_4$] | 51 | 0.3 | 0.15 |
| 71, Cp*((1-Ad)$_3$PN)Zr(CH$_2$Ph)$_2$ | 190 | [Ph$_3$C][B(C$_6$F$_5$)$_4$] | 49 | 0.3 | 0.30 |
| 72, Cp*((1-Ad)$_3$PN)Zr(CH$_2$Ph)$_2$ | 190 | [Ph$_3$C][B(C$_6$F$_5$)$_4$] | 68 | 0.3 | 0.50 |
| 73, Cp*((1-Ad)$_3$PN)Zr(CH$_2$Ph)$_2$ | 190 | [Ph$_3$C][B(C$_6$F$_5$)$_4$] | 47 | 0.3 | 0.50 |
| 74, Cp((1-Ad)$_3$PN)ZrMe$_2$ | 140 | [Ph$_3$C][B(C$_6$F$_5$)$_4$] | 54.00 | 0.3 | 0.00 |
| 75, Cp((1-Ad)$_3$PN)ZrMe$_2$ | 140 | [Ph$_3$C][B(C$_6$F$_5$)$_4$] | 33.23 | 0.3 | 0.15 |
| 76, Cp((1-Ad)$_3$PN)ZrMe$_2$ | 140 | [Ph$_3$C][B(C$_6$F$_5$)$_4$] | 12.71 | 0.3 | 0.30 |
| 77, Cp((1-Ad)$_3$PN)ZrMe$_2$ | 140 | [Ph$_3$C][B(C$_6$F$_5$)$_4$] | 5.40 | 0.3 | 0.50 |
| 78, Cp((1-Ad)$_3$PN)ZrMe$_2$ | 190 | | 3.38 | 0.3 | 0.00 |
| 79, Cp((1-Ad)$_3$PN)ZrMe$_2$ | 190 | [Ph$_3$C][B(C$_6$F$_5$)$_4$] | 2.88 | 0.3 | 0.15 |
| 80, Cp((1-Ad)$_3$PN)ZrMe$_2$ | 190 | [Ph$_3$C][B(C$_6$F$_5$)$_4$] | 2.70 | 0.3 | 0.30 |
| 81, Cp((1-Ad)$_3$PN)ZrMe$_2$ | 190 | [Ph$_3$C][B(C$_6$F$_5$)$_4$] | 2.40 | 0.3 | 0.50 |

| Example, Complex (Inventive) | Ethylene Conversion (%) | Activity ($k_p$) | SCB/1000C | Mw | PD Mw/Mn |
|---|---|---|---|---|---|
| 57, Cp*((1-Ad')$_2$(1-Ad)PN)Zr(CH$_2$Ph)$_2$ | 90.43 | 12,077 | 1.4 | 33,461 | 2.2 |
| 58, Cp*((1-Ad')$_2$(1-Ad)PN)Zr(CH$_2$Ph)$_2$ | 90.65 | 11,933 | 3.4 | 28,982 | 2.04 |
| 59, Cp*((1-Ad')$_2$(1-Ad)PN)Zr(CH$_2$Ph)$_2$ | 90.01 | 11,089 | 5.5 | 25,420 | 1.9 |

TABLE 5-continued

Polymerization Results with Zirconium 1-Adamantyl Phosphinimine Catalysts[5]

| | | | | | |
|---|---|---|---|---|---|
| 60, Cp*((1-Ad')$_2$(1-Ad)PN)Zr(CH$_2$Ph)$_2$ | 90.27 | 2,409 | 3.1 | 25,432 | 1.86 |
| 61, Cp*((1-Ad')$_2$(1-Ad)PN)Zr(CH$_2$Ph)$_2$ | 90.27 | 6,423 | <0.5 | 18,055 | 1.94 |
| 62, Cp*((1-Ad')$_2$(1-Ad)PN)Zr(CH$_2$Ph)$_2$ | 89.50 | 5,901 | 1.3 | 17,576 | 1.88 |
| 63, Cp*((1-Ad')$_2$(1-Ad)PN)Zr(CH$_2$Ph)$_2$ | 90.18 | 6,358 | 2.7 | 16,826 | 1.76 |
| 64, Cp*((1-Ad')$_2$(1-Ad)PN)Zr(CH$_2$Ph)$_2$ | 90.53 | 9,927 | 4.4 | 14,732 | 2.01 |
| 65, Cp*((1-Ad)$_3$PN)Zr(CH$_2$Ph)$_2$ | 89.50 | 16,094 | | | |
| 66, Cp*((1-Ad)$_3$PN)Zr(CH$_2$Ph)$_2$ | 90.3 | 14,873 | | | |
| 67, Cp*((1-Ad)$_3$PN)Zr(CH$_2$Ph)$_2$ | 91.38 | 13,344 | n/a | n/a | n/a |
| 68, Cp*((1-Ad)$_3$PN)Zr(CH$_2$Ph)$_2$ | 90.36 | 8,652 | 3.2 | 29,233 | 1.98 |
| 69, Cp*((1-Ad)$_3$PN)Zr(CH$_2$Ph)$_2$ | 90.78 | 8,891 | <0.5 | 18,297 | 2.02 |
| 70, Cp*((1-Ad)$_3$PN)Zr(CH$_2$Ph)$_2$ | 90.29 | 9,196 | 1.3 | 17,572 | 1.7 |
| 71, Cp*((1-Ad)$_3$PN)Zr(CH$_2$Ph)$_2$ | 90.73 | 9,240 | 3.6 | 16,915 | 1.89 |
| 72, Cp*((1-Ad)$_3$PN)Zr(CH$_2$Ph)$_2$ | 89.31 | 10,854 | 4.5 | 16,483 | 1.9 |
| 73, Cp*((1-Ad)$_3$PN)Zr(CH$_2$Ph)$_2$ | 90.12 | 8,237 | 4.3 | 16,832 | 1.89 |
| 74, Cp((1-Ad)$_3$PN)ZrMe$_2$ | 90.38 | 9,756 | | | |
| 75, Cp((1-Ad)$_3$PN)ZrMe$_2$ | 89.38 | 5,378 | | | |
| 76, Cp((1-Ad)$_3$PN)ZrMe$_2$ | 89.00 | 1,977 | | | |
| 77, Cp((1-Ad)$_3$PN)ZrMe$_2$ | 89.00 | 840 | | | |
| 78, Cp((1-Ad)$_3$PN)ZrMe$_2$ | 89.31 | 542 | 2.8 | 15,302 | 4.11 |
| 79, Cp((1-Ad)$_3$PN)ZrMe$_2$ | 89.61 | 478 | 6.7 | 10,291 | 3.5 |
| 80, Cp((1-Ad)$_3$PN)ZrMe$_2$ | 89.51 | 443 | 9.5 | 7,354 | 2.9 |
| 81, Cp((1-Ad)$_3$PN)ZrMe$_2$ | 89.90 | 411 | 15.3 | 5,524 | 3.2 |

Note[5]:
Scavenger = MAO; Al concentration in the reactor was 20 umol/L; [Ph$_3$C][B(C$_6$F$_5$)$_4$]/Zr molar ratio = 1.2; B(C$_6$F$_5$)$_3$/Zr molar ratio = 1.2; BHEB = 2,6-di-tert-butyl-4-ethylphenol; 1-Ad = 1-Adamantyl; 1-Ad' =3,5-Me$_2$-1-Ad, Cp* = pentamethylcyclopentadienyl; Cp = cyclopentadienyl.

The data provided in Tables 4 and 5, show that further hafnium based and zirconium based complexes having a cyclopentadienyl type ligand and a phosphinimine ligand bearing an unsubstituted or substituted adamantyl moiety may be employed in active olefin polymerization catalyst systems, in olefin polymerization processes such as a solution phase olefin polymerization process.

Non-limiting embodiments of the present disclosure include the following: Embodiment A. A complex having the formula (PI)(Cp)ML$_2$, wherein:

I) PI is a phosphinimine ligand defined by the formula:

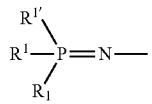

where N is a nitrogen atom; P is a phosphorus atom; each R$^1$ is unsubstituted adamantyl, or substituted adamantyl; and R$^{1'}$ is selected from the group consisting of unsubstituted adamantyl, substituted adamantyl and C$_1$ to C$_6$ hydrocarbyl;

II) Cp is a cyclopentadienyl-type ligand comprising a 5-membered carbon ring having delocalized bonding within the ring and bound to M, which rings are unsubstituted or may be further substituted;

III) each L is an activatable ligand; and

IV) M is zirconium or hafnium.

Embodiment B. The complex according to Embodiment A wherein R$^{1'}$ is unsubstituted adamantyl, or substituted adamantyl.

Embodiment C. The complex according to Embodiment A wherein R$^{1'}$ is unsubstituted adamantyl.

Embodiment D. The complex according to Embodiment A, B or C wherein each R$^1$ is unsubstituted adamantyl.

Embodiment E. The complex according to Embodiment A wherein R$^{1'}$ and each R$^1$ is 1-adamantyl.

Embodiment F. The complex according to Embodiment A, B, C, D or E wherein Cp is (pentamethyl)cyclopentadienyl.

Embodiment G. The complex according to Embodiment A, B, C, D or E wherein Cp is cyclopentadienyl.

Embodiment H. The complex according to Embodiment A, B, C, D, E, F or G wherein M is zirconium.

Embodiment I. The complex according to Embodiment A, B, C, D, E, F or G wherein M is hafnium.

Embodiment J. An olefin polymerization catalyst system comprising:

A) a complex having the formula (PI)(Cp)ML$_2$, wherein:

I) PI is a phosphinimine ligand defined by the formula:

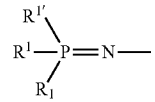

where N is a nitrogen atom; P is a phosphorus atom; each R$^1$ is unsubstituted adamantyl, or substituted adamantyl; and R$^{1'}$ is selected from the group consisting of unsubstituted adamantyl, substituted adamantyl and C$_1$ to C$_6$ hydrocarbyl;

II) Cp is a cyclopentadienyl-type ligand comprising a 5-membered carbon ring having delocalized bonding within the ring and bound to M, which rings are unsubstituted or may be further substituted;

III) each L is an activatable ligand; and

IV) M is zirconium or hafnium; and

B) an activator.

Embodiment K. The olefin polymerization catalyst system according to Embodiment I wherein the activator is selected from the group consisting of an aluminoxane; an organoaluminum compound; an ionic activator; and mixtures thereof.

Embodiment L. The olefin polymerization catalyst system according to Embodiment J or K wherein $R^{1'}$ is unsubstituted adamantyl, or substituted adamantyl.

Embodiment M. The olefin polymerization catalyst system according to Embodiment J or K wherein $R^{1'}$ is unsubstituted adamantyl.

Embodiment N. The olefin polymerization catalyst system according to claim Embodiment J, K, L or M wherein each $R^1$ is unsubstituted adamantyl.

Embodiment O. The olefin polymerization catalyst system according to claim Embodiment J or K wherein $R^{1'}$ and each $R^1$ is 1-adamantyl.

Embodiment P. The olefin polymerization catalyst system according Embodiment J, K, L, M, N or O wherein Cp is (pentamethyl) cyclopentadienyl.

Embodiment Q. The olefin polymerization catalyst system according to Embodiment J, K, L, M, N or O wherein Cp is cyclopentadienyl.

Embodiment R. The olefin polymerization catalyst system according to Embodiment J, K, L, M, N, O, P or Q wherein M is zirconium.

Embodiment S. The olefin polymerization catalyst system according to Embodiment J, K, L, M, N, O, P or Q wherein M is hafnium.

Embodiment T. A process for the polymerization of olefins comprising contacting one or more of ethylene and $C_3$ to $C_{10}$ alpha olefins with the olefin polymerization catalyst system according to any one of claims Embodiment J, K, L, M, N, O, P, Q, R or S under polymerization conditions.

Embodiment U. The process according to Embodiment T wherein the one or more of ethylene and $C_3$ to $C_{10}$ alpha olefins consists of a) ethylene; and b) one or more olefins selected from the group consisting of 1-butene; 1-hexene; and 1-octene.

Embodiment V. A process for the (co) polymerization of ethylene comprising:
A) preparing a first polymer solution by polymerizing ethylene, optionally with one or more $C_3$ to $C_{10}$ alpha olefins, in a solvent in a first polymerization reactor at a temperature of from 80 to 200° C. and a pressure of from 1,000 to 8,000 psi in the presence of (i) the complex according to Embodiment A; and (ii) an activator consisting essentially of an aluminoxane and an ionic activator; and
B) passing said first polymer solution into a second polymerization reactor and (co) polymerizing ethylene, optionally with one or more $C_3$-$C_{10}$ alpha olefins, in the presence of a Ziegler Natta catalyst.

Embodiment W. A process for the (co) polymerization of ethylene comprising:
A) preparing a first polymer solution by polymerizing ethylene, optionally with one or more $C_3$ to $C_{10}$ alpha olefins, in a solvent in a first polymerization reactor at a temperature of from 80 to 200° C. and a pressure of from 1,000 to 8,000 psi in the presence of (i) the complex according to Embodiment A; and (ii) an activator consisting essentially of an organoaluminum compound and an ionic activator; and
B) passing said first polymer solution into a second polymerization reactor and (co) polymerizing ethylene, optionally with one or more $C_3$-$C_{10}$ alpha olefins, in the presence of a Ziegler Natta catalyst.

INDUSTRIAL APPLICABILITY

Provided are zirconium and hafnium complexes which have a cyclopentadienyl type ligand and a phosphinimine ligand bearing an adamantyl (unsubstituted or substituted) moiety. The new complexes are active in the polymerization of ethylene with an alpha olefin.

The invention claimed is:
1. A complex having the formula $(PI)(Cp)ML_2$, wherein:
I) PI is a phosphinimine ligand defined by the formula:

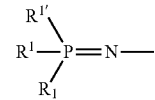

where N is a nitrogen atom; P is a phosphorus atom; each $R^1$ is unsubstituted adamantyl, or substituted adamantyl; and $R^{1'}$ is selected from the group consisting of unsubstituted adamantyl, substituted adamantyl and $C_1$ to $C_6$ hydrocarbyl;
II) Cp is a cyclopentadienyl-type ligand comprising a 5-membered carbon ring having delocalized bonding within the ring and bound to M, which ring is unsubstituted or may be further substituted;
III) each L is an activatable ligand; and
IV) M is zirconium or hafnium.

2. The complex of claim 1, wherein $R^{1'}$ is unsubstituted adamantyl, or substituted adamantyl.

3. The complex of claim 1, wherein $R^{1'}$ is unsubstituted adamantyl.

4. The complex of claim 3, wherein each $R^1$ is unsubstituted adamantyl.

5. The complex of claim 4, wherein $R^{1'}$ and each $R^1$ is 1-adamantyl.

6. The complex of claim 1, wherein Cp is (pentamethyl) cyclopentadienyl.

7. The complex of claim 1, wherein Cp is cyclopentadienyl.

8. The complex of claim 1, wherein M is zirconium.

9. The complex of claim 1, wherein M is hafnium.

10. An olefin polymerization catalyst system comprising:
A) a complex having the formula $(PI)(Cp)ML_2$, wherein:
I) PI is a phosphinimine ligand defined by the formula:

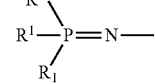

where N is a nitrogen atom; P is a phosphorus atom; each $R^1$ is unsubstituted adamantyl, or substituted adamantyl; and $R^{1'}$ is selected from the group consisting of unsubstituted adamantyl, substituted adamantyl and $C_1$ to $C_6$ hydrocarbyl;
II) Cp is a cyclopentadienyl-type ligand comprising a 5-membered carbon ring having delocalized bonding within the ring and bound to M, which ring is unsubstituted or may be further substituted;
III) each L is an activatable ligand; and
IV) M is zirconium or hafnium; and
B) an activator.

11. The olefin polymerization catalyst of claim 10, wherein
the activator is selected from the group consisting of an aluminoxane; an
organoaluminum compound; an ionic activator; and mixtures thereof.

12. The olefin polymerization catalyst of claim 10, wherein $R^{1'}$ is unsubstituted adamantyl, or substituted adamantyl.

13. The olefin polymerization catalyst of claim 10, wherein $R^{1'}$ is unsubstituted adamantyl.

14. The olefin polymerization catalyst of claim 13, wherein each $R^1$ is unsubstituted adamantyl.

15. The olefin polymerization catalyst of claim 14, wherein $R^{1'}$ and each $R^1$ is 1-adamantyl.

16. The olefin polymerization catalyst system of claim 10, wherein Cp is (pentamethyl)cyclopentadienyl.

17. The olefin polymerization catalyst system of claim 10, wherein Cp is cyclopentadienyl.

18. The olefin polymerization catalyst system of claim 10, wherein M is zirconium.

19. The olefin polymerization catalyst system of claim 10, wherein M is hafnium.

20. A process for the polymerization of olefins, the process comprising contacting one or more of ethylene and $C_3$ to $C_{10}$ alpha olefins with the olefin polymerization catalyst system of claim 10 under polymerization conditions.

21. The process according to claim 20 wherein the one or more of ethylene and $C_3$ to $C_{10}$ alpha olefins consists of a) ethylene; and b) one or more olefins selected from the group consisting of 1-butene; 1-hexene; and 1-octene.

22. A process for the (co) polymerization of ethylene, the process comprising:

A) preparing a first polymer solution by polymerizing ethylene, optionally with one or more $C_3$ to $C_{10}$ alpha olefins, in a solvent in a first polymerization reactor at a temperature of from 80 to 200° C. and a pressure of from 1,000 to 8,000 psi in the presence of (i) the complex according to claim 1; and (ii) an activator consisting essentially of an aluminoxane and an ionic activator; and B) passing said first polymer solution into a second polymerization reactor and (co) polymerizing ethylene, optionally with one or more $C_3$-$C_{10}$ alpha olefins, in the presence of a Ziegler Natta catalyst.

23. A process for the (co) polymerization of ethylene, the process comprising:

A) preparing a first polymer solution by polymerizing ethylene, optionally with one or more $C_3$ to $C_{10}$ alpha olefins, in a solvent in a first polymerization reactor at a temperature of from 80 to 200° C. and a pressure of from 1,000 to 8,000 psi in the presence of (i) the complex according to claim 1; and (ii) an activator consisting essentially of an organoaluminum compound and an ionic activator; and B) passing said first polymer solution into a second polymerization reactor and (co) polymerizing ethylene, optionally with one or more $C_3$-$C_{10}$ alpha olefins, in the presence of a Ziegler Natta catalyst.

* * * * *